(12) United States Patent
Trawick et al.

(10) Patent No.: US 10,403,268 B2
(45) Date of Patent: Sep. 3, 2019

(54) METHOD AND SYSTEM OF AUTOMATIC SPEECH RECOGNITION USING POSTERIOR CONFIDENCE SCORES

(71) Applicant: Intel IP Corporation, Santa Clara, CA (US)

(72) Inventors: David J. Trawick, San Jose, CA (US); Joachim Hofer, Munich (DE); Josef G. Bauer, Munich (DE); Georg Stemmer, Munich (DE); Da-Ming Chiang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/260,021

(22) Filed: Sep. 8, 2016

(65) Prior Publication Data
US 2018/0068653 A1 Mar. 8, 2018

(51) Int. Cl.
*G10L 15/16* (2006.01)
*G10L 15/14* (2006.01)
*G10L 15/08* (2006.01)
*G10L 15/187* (2013.01)
*G10L 15/02* (2006.01)
*G10L 25/84* (2013.01)
*G10L 15/22* (2006.01)

(52) U.S. Cl.
CPC .......... *G10L 15/142* (2013.01); *G10L 15/08* (2013.01); *G10L 15/14* (2013.01); *G10L 15/16* (2013.01); *G10L 15/187* (2013.01); *G10L 15/02* (2013.01); *G10L 15/22* (2013.01); *G10L 25/84* (2013.01); *G10L 2015/025* (2013.01)

(58) Field of Classification Search
CPC .......... G10L 15/14; G10L 15/16; G10L 15/08
See application file for complete search history.

(56) References Cited

U.S. PATENT DOCUMENTS

| 7,324,940 | B1 | 1/2008 | Miller et al. | |
|---|---|---|---|---|
| 8,442,821 | B1 * | 5/2013 | Vanhoucke | G10L 15/14 704/232 |
| 9,224,386 | B1 * | 12/2015 | Weber | G10L 15/06 |
| 9,865,254 | B1 * | 1/2018 | Filimonov | G10L 15/02 |
| 10,134,425 | B1 * | 11/2018 | Johnson, Jr. | G10L 25/87 |
| 2006/0136206 | A1 * | 6/2006 | Ariu | G10L 15/02 704/246 |
| 2007/0219797 | A1 | 9/2007 | Liu et al. | |
| 2007/0288231 | A1 * | 12/2007 | Mukerjee | G06Q 30/02 704/9 |

(Continued)

FOREIGN PATENT DOCUMENTS

KR 20150052600 5/2015

OTHER PUBLICATIONS

Bernardis et al., "Improving Posterior Based Confidence Measures in Hybrid HMM/ANN Speech Recognition Systems", Aug. 1998, to appear in Proceedings of ICSLP '98, IDIAP Research Report 98-11, pp. 2-7 (9 pages).

(Continued)

*Primary Examiner* — Bryan S Blankenagel
(74) *Attorney, Agent, or Firm* — Green, Howard & Mughal LLP.

(57) ABSTRACT

A system, article, and method include techniques of automatic speech recognition using posterior confidence scores.

24 Claims, 12 Drawing Sheets

(56) References Cited

U.S. PATENT DOCUMENTS

| | | | |
|---|---|---|---|
| 2008/0114595 A1* | 5/2008 | Vair | G10L 15/08 704/236 |
| 2008/0120094 A1* | 5/2008 | Mate | G10L 15/30 704/201 |
| 2010/0004932 A1* | 1/2010 | Washio | G10L 15/05 704/255 |
| 2010/0161334 A1* | 6/2010 | Kang | G10L 15/10 704/251 |
| 2010/0217589 A1* | 8/2010 | Gruhn | G10L 15/063 704/232 |
| 2012/0101817 A1* | 4/2012 | Mocenigo | G10L 15/063 704/231 |
| 2013/0166279 A1* | 6/2013 | Dines | G10L 15/02 704/8 |
| 2014/0142940 A1* | 5/2014 | Ziv | G10L 17/005 704/235 |
| 2014/0343940 A1* | 11/2014 | Yassa | G10L 15/26 704/235 |
| 2015/0112685 A1 | 4/2015 | Zhang et al. | |
| 2015/0120277 A1* | 4/2015 | Song | G06F 17/289 704/2 |
| 2015/0127327 A1* | 5/2015 | Bacchiani | G10L 25/30 704/202 |
| 2015/0269938 A1* | 9/2015 | Lloyd | G10L 15/183 704/235 |
| 2015/0332673 A1* | 11/2015 | Li | G06F 17/276 704/235 |
| 2016/0240188 A1 | 8/2016 | Seto | |
| 2016/0336007 A1* | 11/2016 | Hanazawa | G06F 17/30681 |
| 2016/0379632 A1* | 12/2016 | Hoffmeister | G10L 15/18 704/253 |
| 2017/0256255 A1* | 9/2017 | Bocklet | G10L 15/10 |
| 2017/0270919 A1* | 9/2017 | Parthasarathi | G10L 15/20 |

OTHER PUBLICATIONS

Colibro et al, "A Confidence Measure Invariant to Language and Grammar", Ninth European Conference on Speech Communication and Technology. 2005. pp. 1-4 (5 pages).

Rivlin et al., "A Phone-Dependent Confidence Measure for Utterance Rejection", Acoustics, Speech, and Signal Processing, 1996. ICASSP-96. Conference Proceedings., 1996 IEEE International Conference on. vol 1. IEEE, 1996. 4 pages.

International Search Report and Written Opinion from PCT/US2017/045793 dated Dec. 11, 2017, 15 pgs.

International Preliminary Report on Patentability for PCT Application No. PCT/US17/45793, dated Mar. 21, 2019.

* cited by examiner

FIG. 1      100
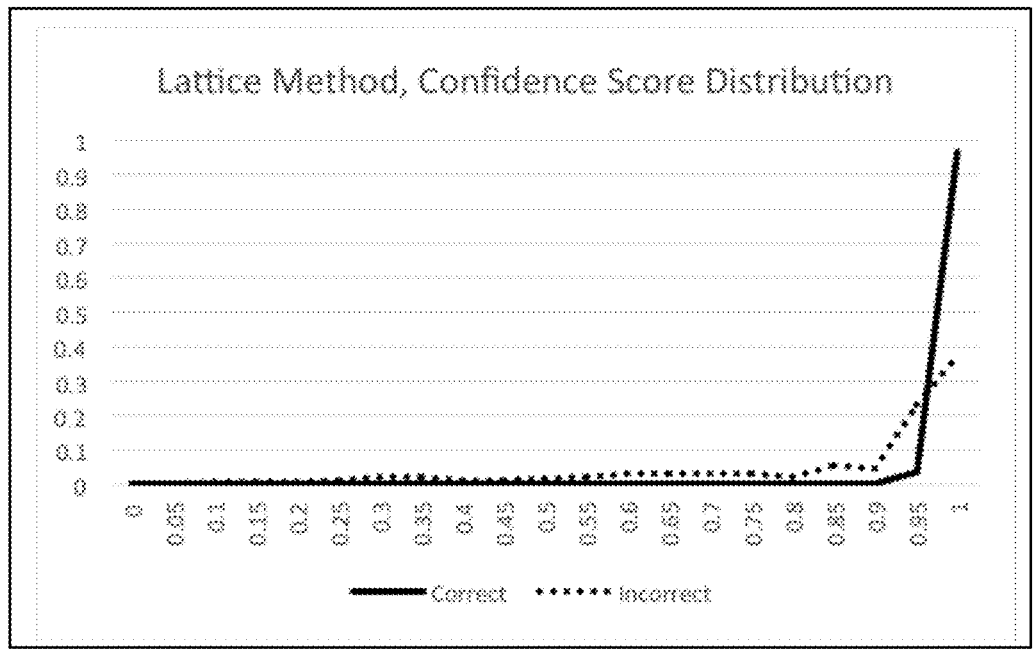
FIG. 2      200
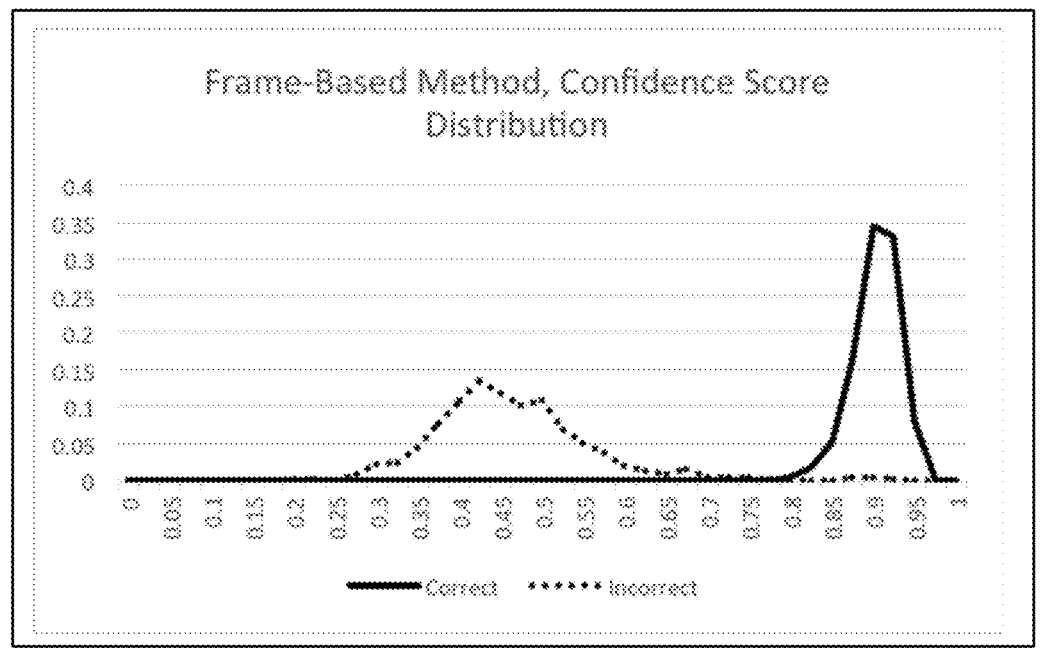

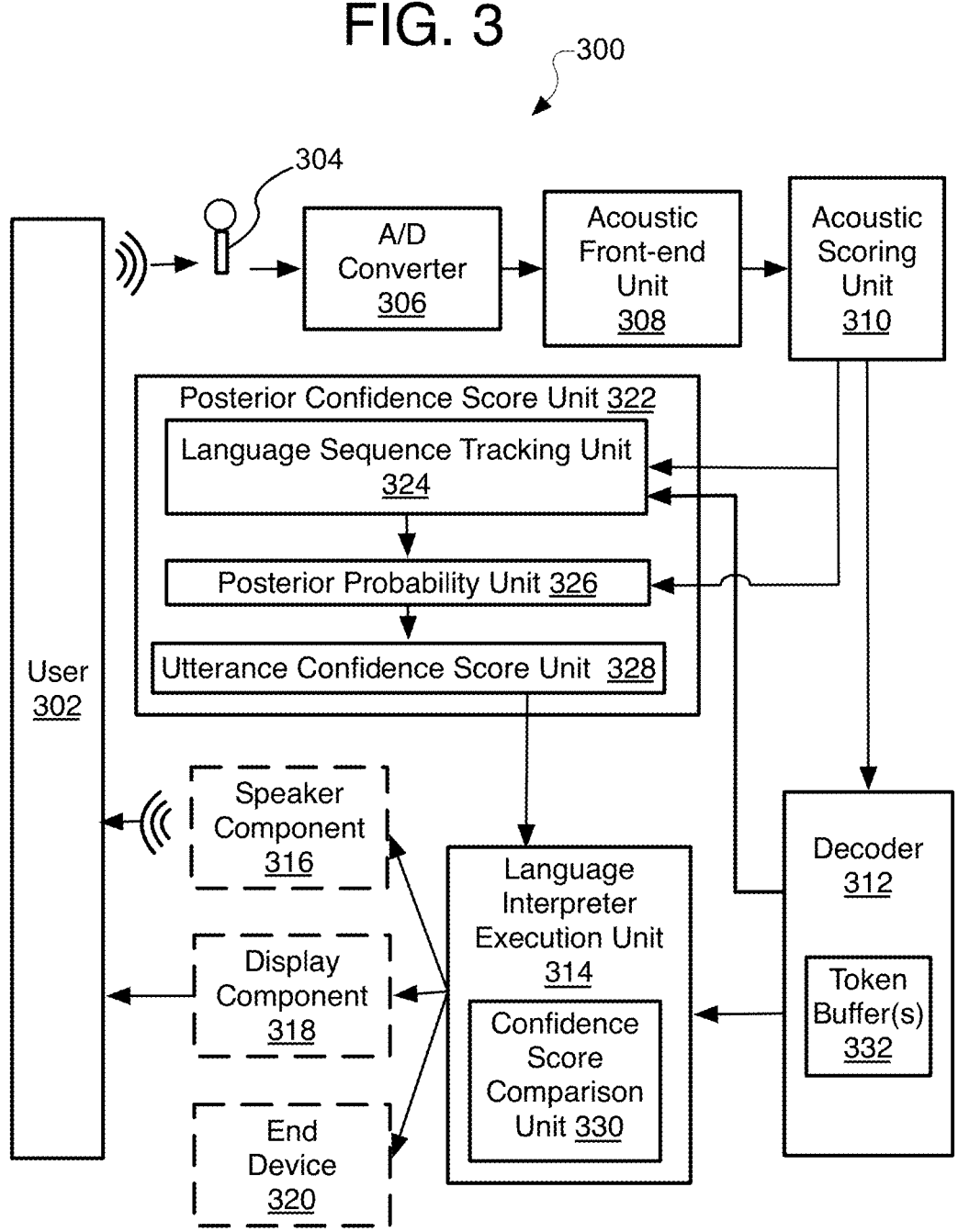

RECEIVE A PLURALITY OF FRAMES OF AN AUDIO SEQUENCE WITH AUDIO DATA OF HUMAN SPEECH, WHEREIN INDIVIDUAL FRAMES OF THE PLURALITY OF FRAMES EACH HAVE A FRAME TERM THAT IS A SEGMENT OF HUMAN SPEECH WHEREIN ONE OR MORE FRAME TERMS FORM A SINGLE PHONEME 402

↓

RECEIVE FRAME VALUES WHEREIN INDIVIDUAL FRAME VALUES ARE ASSOCIATED WITH A DIFFERENT FRAME TERM AND USED TO FORM ACOUSTIC SCORES FOR A PHONEME 404

↓

DETERMINE WHICH FRAME TERMS ARE ASSOCIATED WITH A CANDIDATE UTTERANCE OF A LANGUAGE MODEL 406

↓

GENERATE A PLURALITY OF PROBABILITIES EACH PROBABILITY BEING OF AN INDIVIDUAL ACOUSTIC MODEL STATE GIVEN ONE OF THE FRAME TERMS ASSOCIATED WITH THE UTTERANCE, WHEREIN EACH FRAME TYERM IS SEPARATELY PROVIDED TO AN ACOUSTIC MODEL HAVING MULTIPLE ACOUSTIC MODEL STATES 408

↓

DETERMINE A CONFIDENCE SCORE OF THE UTTERANCE TO BE USED TO DETERMINE WHETHER THE UTTERANCE IS LIKELY TO MATCH THE ACTUAL SPEECH RECORDED ON THE FRAMES 410

COMBINE THE PROBABILITIES OF THE FRAME TERMS ASSOCIATED WITH THE UTTERANCE
412

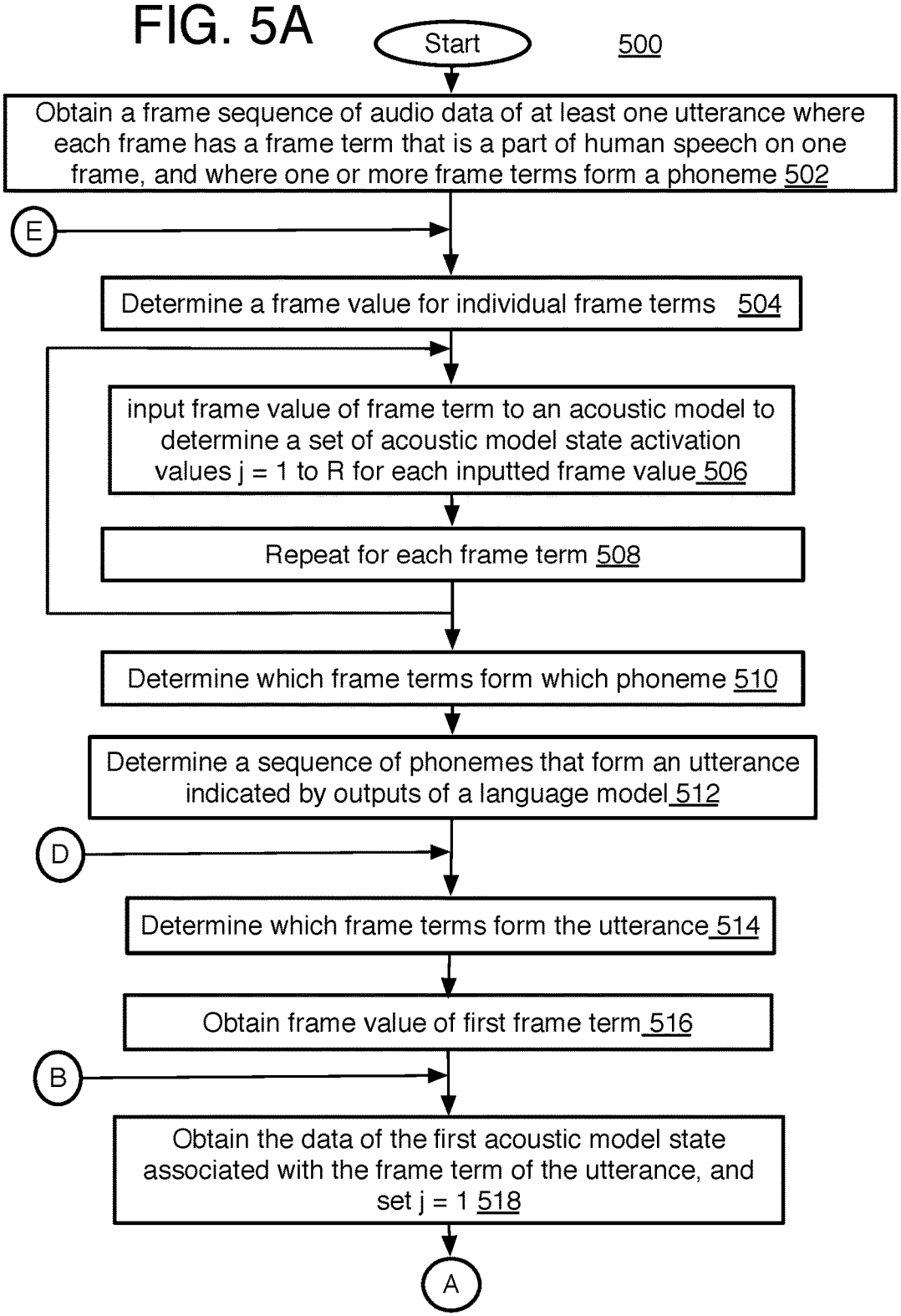

METHOD AND SYSTEM OF AUTOMATIC SPEECH RECOGNITION USING POSTERIOR CONFIDENCE SCORES

BACKGROUND

Speech recognition systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Such systems may be speaker-dependent, where the system is trained by having the user repeat words, or speaker-independent where anyone may provide immediately recognized words. Speech recognition is now considered a fundamental part of mobile computing devices. Some small vocabulary systems that use small language models (LMs) may be configured to understand a fixed set of single word commands or short phrases, such as for operating a mobile phone that understands the terms "call" or "answer", or an exercise wrist-band that understands the word "start" to start a timer for example. These may be referred to as command and control (C&C) systems. Other systems may have very large vocabularies and use statistical language models (SLMs) such as for dictation or voice activated search engines found on smart phones.

The conventional automatic speech recognition (ASR) system receives audio data from an audio signal with human speech and then constructs phonemes from the extracted sounds from that signal. Words are then constructed with the phonemes, and then word sequences or transcriptions are built from the words until one or more output transcriptions are developed. Thereafter, a confidence score is generated for each transcription and is used to determine whether the output transcription is accurate and should be used or presented to a user, usually by comparing the confidence score to a threshold. The generated confidence scores, however, often can be uninformative especially with small vocabularies when there are very few alternative transcriptions being considered. This can result in errors where the system presents the wrong words to the user during dictation for example, or misunderstands or cannot understand the user's inquiry or command when the computer is supposed to perform an action in response to the user's language.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a known lattice method confidence score distribution chart;

FIG. 2 is a frame-based confidence score distribution chart for the automatic speech recognition process using posterior confidence scores according to the implementations herein;

FIG. 3 is a schematic diagram showing an automatic speech recognition system;

FIG. 4 is a flow chart of an automatic speech recognition process using posterior confidence scores according to the implementations herein;

FIGS. 5A-5C is a detailed flow chart of an automatic speech recognition process using posterior confidence scores according to the implementations herein;

DETAILED DESCRIPTION

Figure 5B:
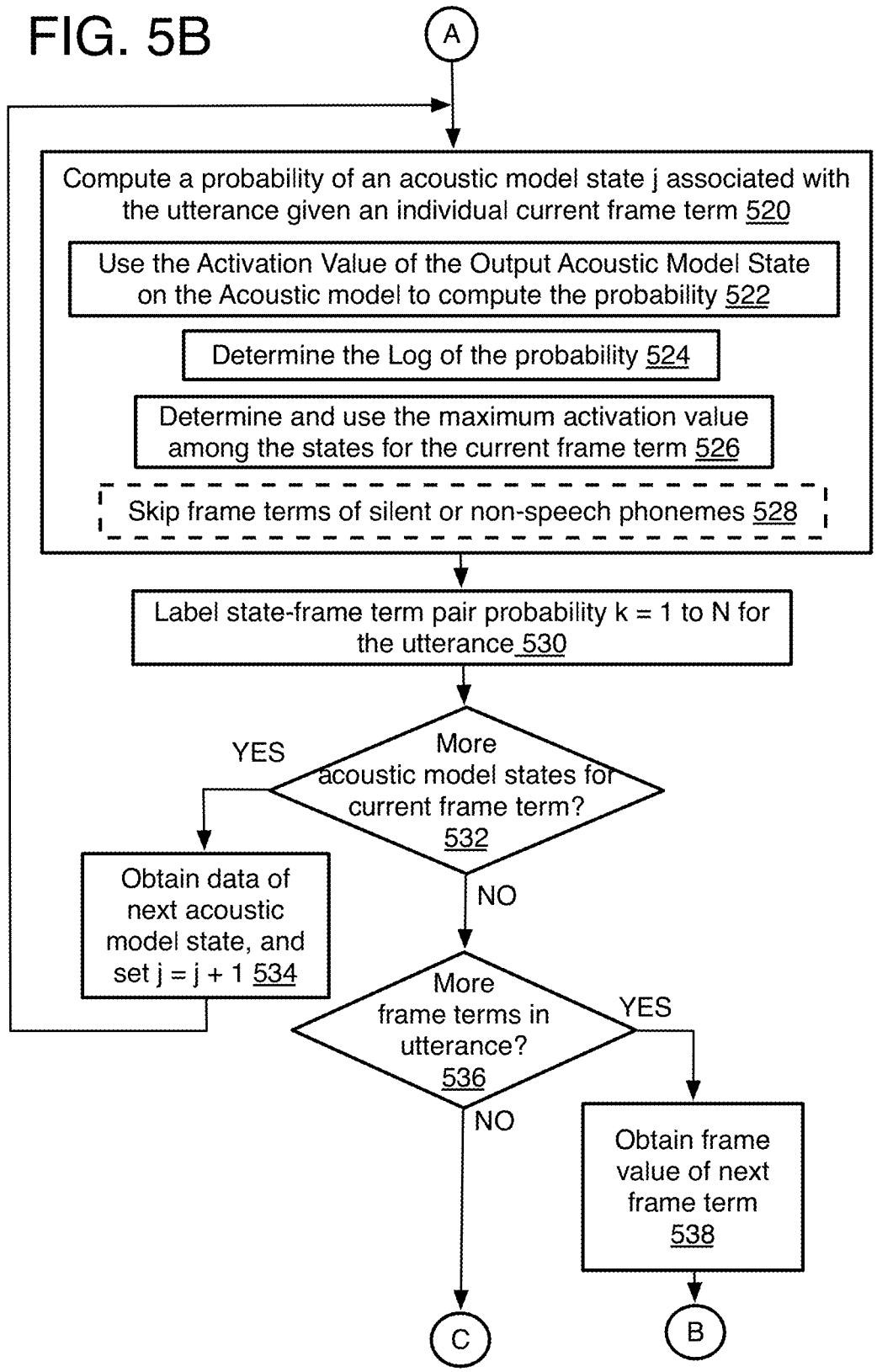

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, mobile devices such as smart phones or wearables such as a headphone, headset, smart watch, smart glasses, or exercise band, hearing aid, video game panels or consoles, television set top boxes, on-board vehicle systems, dictation machines, security and environment control systems for buildings, internet of things (IoT) implementations, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic speech recognition using posterior confidence scores.

Speech enabled human machine interfaces (HMI) record audio with a microphone, process the acoustic data with a computing device and then output speech or visual information to the user, or perform some action in response to the user's language. Specifically, the conventional automatic speech recognition (ASR) system extracts audio features from an audio signal and that are identified as human speech. The ASR system then uses an acoustic model (such as deep neural networks (DNNs)) to determine a probability or acoustic score for each phoneme or a phoneme in context (such as a tri-phone). The acoustic scores are then used in a decoder that has language models to construct words from the phonemes, and then construct word sequences or transcriptions (also referred to as utterances herein) out of the words, where each word and word sequence has a probability score as well. Thereafter, each output transcription or utterance is provided with a confidence score. The confidence scores are used to assess the confidence that the output is correct and are often compared to a threshold to determine whether the output is accurate (relative to the actually spoken words) and should be used or presented to a user, or inaccurate (not similar to the actually spoken words) and is to be rejected and will not be presented to a user. This may be used to reject out-of-grammar or out-of-vocabulary utterances and words, for example, or background noise including speech not addressed to the ASR system.

Determination of good confidence scores is difficult, however, because the ASR system does not know what was actually spoken by a user. Rather, the ASR system must estimate the quality of its interpretation from internal models, training data, and other parameters derived during the recognition process. Previous solutions typically fall into one of three approaches. One solution is to generate an estimate of the posterior probability of the output text given the input speech. The posterior probability can then be used as a confidence score. Another solution is a classification decision function built from several available features of the input and output and used to determine whether to accept or reject the transcription. Yet another solution is a version of hypothesis testing to determine whether an output transcription is good or not, and this includes verifying the chosen output versus all alternative outputs. The methods described herein are a different posterior probability approach as explained below.

Relevant here, the conventional posterior probability approaches are often used with the ASR engine's output lattice. The output lattice or word lattice is a network populated with the constructed word outputs from the ASR engine or decoder and that is used to determine confidence scores for alternative hypothetical utterances formed by the word lattice. The lattice approach works reasonably well when there are enough alternatives determined by the recognizer. This happens when the language model is relatively large, such as when using a large statistical language model (SLM). However, when the language model is small such as with a limited language model or command and control (C&C) environment, there may be very few results in the output lattice. This causes the posterior probabilities, calculated from the words in the lattice, to almost all be one (1.0) when the possible range of scores is from 0.0 to 1.0. This is because there are few incorrect output transcriptions to use to compute probabilities of competing alternatives. If only one transcription exists with nothing or very little to compare to, the confidence score of that transcription may be 1.0 because it is the only choice in the lattice. This results in very little information about the confidence of a transcription thereby likely raising the word error rate (WER) and causing an error for whatever automatic action relies on the correct words being understood. Since automatic speech recognition is considered such a fundamental part of a computer or computing device, such a problem is considered a problem in the functionality of the computer itself.

To resolve these issues, the disclosed process provides a different posterior probability approach. In an ASR acoustic model formed by a hybrid Deep Neural Network (DNN)— Hidden Markov Model (HMM) that provides acoustic phoneme scores to an ASR engine (or decoder), the output layer of the DNN on the acoustic model may be trained to provide an estimate of the posterior probabilities of the HMM acoustic model states at the output layer given the input speech frames. Posterior here refers to the use of the conditional probabilities of that which is to be recognized (such as the state, phoneme, and/or word sequence) given the input data or evidence (such as the frames of the speech data). Those hypothetical sequences or utterances (or sentences) or transcriptions formed on an output word lattice or otherwise considered one of the n-best output utterances of the language model are saved. These transcriptions are then considered the output utterances or transcriptions to be provided with a posterior confidence score formed by using the posterior probabilities.

The posterior confidence scores described herein are frame-based. The identification and order of the phonemes for each output utterance that is to have a confidence score may be provided during the decoding process running the language model. An input audio signal is divided into frames where each frame has a frame term that is a segment of the recorded audio signal and, in turn, a segment or fragment of speech. Each frame term is typically shorter than a single phoneme (one or more frame terms form a single phoneme). A frame value or input value is computed for each frame term and is provided as the input to an acoustic score unit to construct the phonemes and acoustic scores for the phonemes. Thus, by receiving the order of the phonemes in an utterance from the language model, it is possible to determine the association and order of frame terms in the utterance as well. This permits frame-based posterior probabilities and confidence scores to be computed separately from the computation of phoneme acoustic scores that represent multiple frames for a single phoneme, as well as separately from the computation of the language model scores at language model states in the language model.

The posterior probabilities can be computed based on the frame terms (or frame values). Thus, the probabilities of each acoustic model state at the output of an acoustic model given a single frame term can be computed for each frame term in an utterance using acoustic model activation values at the output acoustic model states. Each frame term is inputted into an acoustic model separately so that multiple acoustic model activation states are formed for each frame term. The output acoustic model states at the output of the acoustic model represent all (or some chosen multiple) of possible speech segments or phoneme pieces that could be provided by a frame term. Thus, a probability is computed for each output acoustic model state in the acoustic model with a frame value or a single frame term as the input so that each frame term has, or can have, multiple probabilities (one for each of its output acoustic model states in the acoustic model). A log of the normalization equation is used in order that the multiplication of probabilities may be accomplished by summing the log of the individual probability terms. Thus, the posterior probability equation uses (1) the activation value of a single acoustic model state being analyzed given the frame (or frame term or frame value) input to the acoustic model, (2) the sum of the log's base (such as e) to the exponent having each frame-based activation value for an acoustic state in the acoustic model minus the maximum frame-based activation value among the activation values of all (or multiple) acoustic model states on the acoustic model of the current frame term, and (3) the addition of the maximum frame-based activation value (one example equation is recited below as equation (6)). These probabilities of HMI or other acoustic states given an input frame term are assumed to be probabilistically independent, such that no single frame-based probability depends on the calculation of another frame-based probability. The result is a list of probabilities of frame-term-acoustic model state pairs where each frame term may have more than one probability and where all of the frame terms are associated with an utterance of the language model.

The sum of the logs of the probabilities are then normalized by the number of frames (with one frame term per frame as mentioned) of an utterance in the sum (see equation (7) below as one example). This provides a per-frame confidence score. Alternatively, the confidence score may be provided as a per-phoneme confidence score. In this case, the average frame-based probability scores for each phoneme in an utterance is determined, and then the individual average phoneme scores determined this way are then summed and divided by the number of phonemes in the utterance to yield a confidence score for that utterance. By one example form, phonemes that are not of interest do not contribute to the calculation; in particular, silence and non-speech noise phonemes are omitted in score calculations.

Also, these confidence scores are different from any of the other scores typically present in an ASR engine's decoder. They are neither the acoustic scores nor the language model scores, and must be tracked separately from these other scores. While the acoustic/language model scores are used to guide the decoding process, the new confidence scores are used to evaluate the chosen result instead. In other words, the posterior confidence scores are calculated differently and tracked separately from the acoustic and language model scores of a typical ASR engine. As mentioned, the acoustic and language scores are not used to compute the posterior confidence scores.

By determining the posterior probabilities from the acoustic model output, all the training data (in the acoustic model in the form of activation values of acoustic model states of an acoustic model for a single frame term) are brought to bear on the problem of estimating the posterior probabilities. This provides much better confidence scores on limited language model environments than just using the data from an output word lattice. Also, because the confidence scores are different from the other scores (acoustic and language model) in the system, the confidence scores can directly address their task of providing a measure of the confidence that should be placed in the chosen output. The other scores of the system, the acoustic and language model scores, can remain focused on their task of guiding the choices made by the decoder, independently of confidence estimate considerations. This results in more accurate speech recognition (reduced WER) and thereby improves the functioning of the computer on which it operates. These approaches are explained in greater detail below.

Referring to FIG. 1, a graph 100 show the results of a conventional process that uses the language model scores from an output lattice of a limited language model to determine confidence scores that are compared to a threshold. This is the conventional case where the posterior probabilities are estimated from the data remaining in the output word lattice. The graph 100 shows distributions of the confidence scores. The test data used here includes about 900 in-grammar utterances and 500 out-of-grammar utterances. As shown, no clear threshold exists that differentiates the correct (shown in solid line) from the incorrect (shown in dashed line) utterances. The actual confidence score distribution range is from 0.0 to 1.0 shown along the horizontal axis while the percentages of the utterances with that confidence score are along the vertical axis. As mentioned, since there are few transcriptions to compare, the resulting estimated posterior probabilities tend to be near 1.0 whether the utterance is correctly transcribed or not.

Referring to FIG. 2, however, it is clear here that the new acoustic model posterior probability-based method delivers distributions of the correct and incorrect utterance confidence scores that are separable. The distributions in the new method may be separated using a threshold of about 0.75 since the concentration of incorrect utterance confidence scores are to the left of this point while the concentration of correct utterance confidence scores are to the right of this point in this example. There is no such threshold value separating the distributions of the existing lattice based method above in FIG. 1. This test was run with the same data used for FIG. 1.

Referring to FIG. 3, an automatic speech recognition system 300, such as a speech enabled human machine interface (HMI), may have an audio capture or receiving device 304, such as a microphone for example, to receive sound waves from a user 302, and that converts the waves into a raw electrical acoustical signal that may be recorded in a memory. The system 300 may have an analog/digital (A/D) converter 306 to provide a digital acoustic signal to an acoustic front-end unit 308. The acoustic front-end unit 308 may perform pre-processing which may include noise cancelling, pre-emphasis filtration to flatten the signal, and/or voice activation detection (VAD) to identify the endpoints of utterances as well as linear prediction, and/or additives such as energy measures, and delta and acceleration coefficients, and other processing operations such as weight functions, feature vector stacking and transformations, dimensionality reduction and normalization. Most relevant here, the front-end unit 308 also may divide the acoustic signal into frames, by 10 ms frames by one example, and extracts acoustic features or feature vectors from the acoustic signal using Fourier transforms and so forth. The features or feature vectors may be in the form of a frame term for each frame and as explained above. The front-end unit 308 may compute a frame value for each frame term, and in turn each frame, by using mel-cepstrum for example that generates Mel-frequency cepstral coefficients (MFCCs) for each frame. Generally, the MFCC is a measure of the power or energy of the frame term. The MFCC then may be provided as the input to the acoustic scoring unit 310. The frame values for each frame term (or frame) also may be provided to, or otherwise made accessible to, a posterior confidence score unit 322 to be used to compute posterior probabilities as explained below.

The acoustic scoring unit 310 then uses the input frame values to construct phonemes, or match to phonemes, which may be context dependent, and computes an acoustic score for the phonemes. The acoustic scores may be determined using networks such as an Hidden Markov Model Deep Neural Network (HMM-DNN) by one example. During training, this may include identifying and providing a score for certain tied tri-phones that are classified by one of the three phonemes in context rather than phoneme triples which may be too numerous.

The acoustic score unit 310 uses an acoustic model where the input frame value is input to the model one at a time. The acoustic model has one or more output acoustic model states, and activation values are determined for each of the states in order to compute acoustic scores for phonemes. Specifically, the DNN is trained so that the output layer node corresponding to a given phoneme HMM state is more activated when an input speech frame known to be that phoneme HMM state (from labeled training data) is input into the DNN. The most active node of the output layer is the classification of that frame, and the distribution over all the nodes of the output layer gives (or can be turned into) the probability distribution of the states/classes for that frame. The activations of these DNN output layer nodes vary based on the input speech frame given as input to the DNN at the acoustic model. The acoustic score unit 310 then provides these acoustic scores in the form of activation values to the decoder 312.

These HMM state values or scores (sometimes called MINI output scores) each represent a frame term and are combined with MINI state transition scores at the decoder 312 using a usual HMM scoring algorithm, typically a Viterbi beam search. This combination forms a full phoneme acoustic score possibly representing multiple frame terms that form a single phoneme and that is either generated at the language model (or decoder) or otherwise input to the language model when the MINI operations are considered to be between the acoustic model and language model.

The acoustic scoring unit 310 also may provide the identity and order of frame terms (and/or frame values) of each phoneme as well as the activation values of at least the output acoustic model states of the acoustic model (as generated by each frame), and also stored where this data may be accessible by the posterior confidence score unit 322. The type of acoustic scoring operations that is performed other than the use of an HMM-DNN type of network is not particularly limited as long as it performs the tasks for providing input to compute posterior probabilities as explained herein.

A weighted finite state transducer (WFST) unit or decoder 312 uses the acoustic scores to identify one or more utterance hypotheses and compute their scores. This may be in the form of n-best output utterances that are saved as the decoder is propagating tokens along the language model states. Additionally, the decoder 312 also may place the outputs of the n-best utterances onto a word lattice during decoding that provides confidence measures and/or alternative results. The decoder 312 uses calculations that may be represented as a network of arcs and states that are referred to as WFSTs. The WFSTs may be deterministic or non-deterministic finite state transducers that may or may not have epsilon arcs. The WFSTs may have one or more final states that may or may not have individual weights, and the WFSTs may have one or more initial states. The WFST may be an L-WFST lexicon, a context-sensitive lexicon WFST (CL-WFST), hidden Markov model (HMM) CL-WFST (or HCL-WFST) that may have HMM transitions, HMM state IDs, Gaussian Mixture Model (GMM) densities or deep neural network (DNN) output state IDs as output symbols. The WFST may or may not be determinized, minimized, weight or label pushed or otherwise transformed (e.g. by sorting the arcs by weight, input or output symbol) in any order before being used for decoding. The WFST decoder 312 uses known specific rules, construction, operation, and properties for single-best or n-best speech decoding, and the details of these that are not relevant here are not explained further in order to provide a clear description of the arrangement of the new features described herein. A token buffer 332 may be used to store token data as tokens are being propagated through the networks of the decoder. The results of the decoding, whether a word lattice or language model scores of n-best output utterances, may be provided to a language interpreter execution unit 314 to determine whether any of the output utterances are correct and should be the output recognized speech of the ASR.

Meanwhile, the posterior confidence score unit 322 also monitors or tracks the progression of the decoder. By one form, the posterior confidence score unit 322 has a language sequence tracking unit 324 that receives or obtains the identity and order of language model states and the phonemes used to form those language model states, and this may occur while the decoder is processing and just as the language model states are formed on the decoder. In this case, the posterior confidence score unit may receive utterance sequence data (the order of the phonemes at the language model for example) whether or not those phonemes ultimately are used for an output utterance or transcription. By other forms, the posterior confidence score unit 322 receives the identity and data of language model phonemes forming an output utterance after the output utterances are identified by the decoder so that only the n-best sequences that are outputs of the decoder and/or placed on an output word lattice are provided to the posterior confidence score unit 322.

The posterior confidence score unit 322 also may have a posterior probability unit 326 that reads the phoneme order, and in turn, frame term order, of an utterance sequence being processed at the decoder, and then computes a posterior probability using a log of a softmax normalization equation by one example. This may include using the activation values for each output acoustic model state in an acoustic model each time a frame term is inputted to the acoustic model. Thus, a probability is computed for each output acoustic model state in an acoustic model based on a single frame term input, and then this is repeated for each frame term in an utterance as explained in detail below. This also may involve determining which activation value is the maximum activation value among all of the activation values for a single frame term, and computing a sum of a log base (such as e) to the exponent including the activation value of an acoustic model state being analyzed minus the maximum activation value among all or multiple activation values of the acoustic model states with the same frame input. This is repeated for all acoustic model states and for all frame terms (all state-frame couples for example) of the utterance. The log of this sum is then added to the maximum activation value of the frame, and subtracted from the activation value of the current acoustic model state (of the same frame term) being analyzed. This results in at least one (and usually multiple) probability of each frame term that is a log value. Log is used for faster processing, where sums are calculated instead of products, and for better resolution, where a sum of logs avoids the problems of underflow from the product of many small terms. Again, this is repeated for each frame term in the utterance. The result is an average log of a posterior probability per frame term that is provided to the utterance confidence score unit 328. The details are provided below.

The utterance confidence score unit 328 then computes a confidence score for an output utterance by one example, by summing the log of the posterior probability of the acoustic model states given the frame for each state-frame match for each of the frames in the utterance. The sum is then divided by the number of frames. This provides a per-frame confidence score but other options are available such as to provide a per phoneme confidence score as described below. The utterance posterior confidence score is then provided to the interpretation engine 314 to determine whether the utterance associated with the confidence score should be used. It will be understood that the posterior confidence score unit 322 may be considered a separate module or a unit that is part of the acoustic scoring unit 310, decoder 312, language interpreter and execution unit (or interpretation engine) 314, or other component of the ASR device 300 instead. Also, the ASR engine mentioned here typically includes the decoder 312 but could also include the acoustic scoring unit 310 depending on the context.

As mentioned, the decoding results are made available to a language interpreter and execution unit (or interpretation engine) 314 to determine the user intent. This intent determination or spoken utterance classification may be based solely on the posterior confidence scores where the equations to compute the posterior confidence scores do not include the values that are the output acoustic scores that represent multiple frames to form a single phoneme, for example, from the acoustic scoring unit and that are inputs to the language model, nor the values of output language scores (whether as n-best output utterances or in the form of a word lattice) from the decoder. Otherwise, the utterance posterior confidence scores could be used in addition to separate tests that do use the acoustic and/or language scores in decision trees, form filling algorithms, or statistical classification (e.g. using support-vector networks (SVNs) or deep neural networks (DNNs)) to name a few examples.

For the utterance posterior confidence scores received from the utterance confidence score unit 328, a confidence score comparison unit 330 may compare each of the confidence scores to a threshold determined during training for example and by heuristics. By one form, when the confidence value is closer to 1.0 relative to the threshold value, then the associated utterance is more likely to be correct relative to the actual spoken language and is to be the output of the ASR (as shown in FIG. 2 for example). By other options, this comparison in addition to other comparisons by the interpretation unit 314 must be passed before the utterance is considered the correct output.

Once the user intent is determined for an utterance, the interpretation engine 314 also may output a response or initiate an action. The response may be in audio form through a speaker component 316, or in visual form as text on a display component 318 for example. Otherwise, an action may be initiated to control another end device 320 (whether or not considered as part of, or within, the same device as the speech recognition system 300). For example, a user may state "call home" to activate a phone call on a telephonic device, the user may start a vehicle by stating words into a vehicle fob, or a voice mode on a smart phone may perform certain tasks on the smart phone. The end device 320 may simply be software instead of a physical device or hardware or any combination thereof, and is not particularly limited to anything except to have the ability to understand a command or request resulting from a speech recognition determination and to perform or initiate an action in light of that command or request.

Referring to FIG. 4, an example process 400 for a computer-implemented method of automatic speech recognition using posterior confidence scores is provided. In the illustrated implementation, process 400 may include one or more operations, functions or actions as illustrated by one or more of operations 402 to 412 numbered evenly. By way of non-limiting example, process 400 may be described herein with reference to example speech recognition devices 300 and 900 described herein with any of FIGS. 3 and 9, and where relevant.

Process 400 may include "receive a plurality of frames of an audio sequence with audio data of human speech, wherein individual frames of the plurality of frames each have a frame term that is a segment of human speech wherein one or more frame terms form a single phoneme" 402. Particularly, this operation may include pre-processing a received audio signal of human speech and including dividing the signal into frames each with a frame term as already described above.

Process 400 also may include "receive frame values wherein individual frame values are associated with a different frame term and used to form acoustic scores for a phoneme" 404. This operation includes computing a frame value for each of the frame terms such as mel-cepstrum MFCCs as described elsewhere herein. Each frame value is associated with a different frame in the audio sequence.

Process 400 also may include "determine which frame terms are associated with a candidate utterance of a language model" 406. By one form, this may refer to obtaining which frame terms form which phoneme by the acoustic scoring unit for example, and then either monitoring the setup of a decoder or receiving data from the decoder that indicates which phonemes form a sequence for a candidate output utterance. The identification of the language model states and phonemes of an output utterance may be provided as the decoder is setting up and then running the language model. Alternatively, this may include receiving the identity of the states and phonemes as, or after, the output states and phonemes (on an output utterance) are populated on an output word lattice for example. Otherwise, the phoneme sequence data may be provided once it is determined an utterance will be a saved n-best candidate utterance to be provided by the decoder and may be considered as a final output for the ASR engine. Once all of the identities of the phonemes of an output utterance is determined, it can be determined which frame terms form which phonemes, and therefore indirectly form the output utterance.

As explained below, this process 400 also may include "generate a plurality of probabilities each probability being of an individual acoustic model state given one of the frame terms associated with the utterance, wherein each frame term is separately provided to an acoustic model having multiple acoustic model states" 408. Specifically, a normalization equation is used, such as softmax, and by using the activation value of each or multiple output acoustic model states in an acoustic model receiving a frame value of a current frame term as an input and associated with an output utterance. The log of the equation is taken to improve computational efficiency and improve numerical stability of the probability values as mentioned above. Thus, a log of a posterior probability of each or multiple output acoustic model states of an acoustic model is obtained for a single frame term input. This is repeated for multiple or each frame term of an output utterance. By one example form, the log of a posterior probability of a single acoustic model state given a single frame term is computed by (1) the activation value of the acoustic model state for the single frame term (or the frame-state match value), minus (2) log of the sum of the log base (here e for example) to the exponent having the activation value minus the maximum activation value among multiple activation values of multiple output acoustic model states for the current frame (herein the maximum activation value of the frame), and plus (3) the maximum activation value of the frame (see equation (6) below). This is repeated for each acoustic model state in the acoustic model of a frame, and then repeated for each frame associated with an utterance. More simply, the computation of the posterior probability is repeated for each output acoustic model state in the acoustic model of a frame term, and then repeated for each frame term in an output utterance by one example. Optionally, frame terms directed to non-speech or silence may be omitted from posterior probability computations.

Process 400 also may include "determine a confidence score of the utterance and to be used to determine whether the utterance is likely to match the actual speech recorded on the frames" 410. This may include the operation to "combine the probabilities of the frame terms associated with the utterance" 412. Specifically, a per-frame confidence score may be computed by summing all of the log frame-based posterior probabilities of an utterance (one for each output acoustic model state of each frame term), and then dividing by the number of frames in the utterance. By another option, a per-phoneme confidence score may be computed by first averaging the log frame-based posterior probability for each phoneme. Then, those phoneme averages are summed together and divided by the number of phonemes in the utterance. Again, those posterior probabilities that are for non-speech or silence may be dropped for the confidence score computation if they were computed at all. The confidence scores of an utterance may be used alone as mentioned above, or may be one of a number of tests to determine the correctness of an output utterance. By one example, the confidence score is compared to a threshold for the test.

Figure 5C:
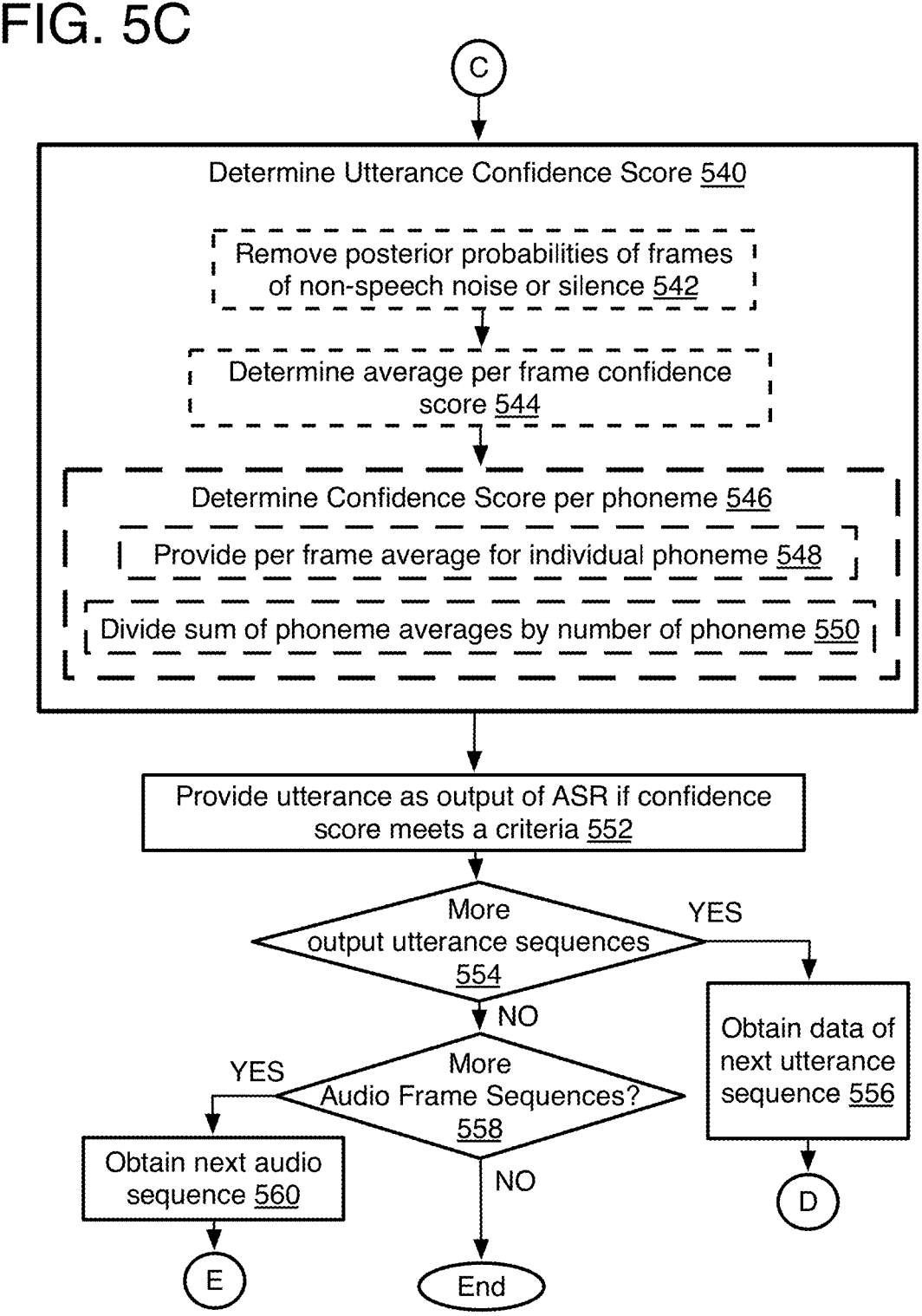

Referring to FIGS. 5A-5C, an example computer-implemented process 500 for automatic speech recognition using posterior confidence scores is provided. In the illustrated implementation, process 500 may include one or more operations, functions or actions as illustrated by one or more of operations 502 to 560 numbered evenly. By way of non-limiting example, process 500 may be described herein with reference to example speech recognition devices described herein with any of FIGS. 3 and 9, and where relevant.

Process 500 may include "obtain a frame sequence of audio data of at least one utterance where each frame has a frame term that is a segment of speech on one frame, and where one or more frame terms form a phoneme" 502, and particularly a recorded utterance of human speech. As mentioned, this may include the use of a sound or audio capture device, pre-processing of the acoustic signal, and feature extraction by a front-end unit. This also may involve dividing the audio signal into frames so that each frame has a frame term where one or more frame terms form a single phoneme, and where one or more phonemes form a single word. The frame often may provide about 10 ms intervals although other lengths for a frame may be used.

Process 500 may include "determine a frame value for individual frame terms" 504. Also as mentioned, mel-cepstrum may be used to compute frame values, such as MFCCs (or just coefficients herein) that is a measure of energy and/or power of the frame term. Combinations of MFCCs or other values can be matched to known speech segment MFCC or other patterns, for example, as a part of acoustic model processing.

Figure 12:
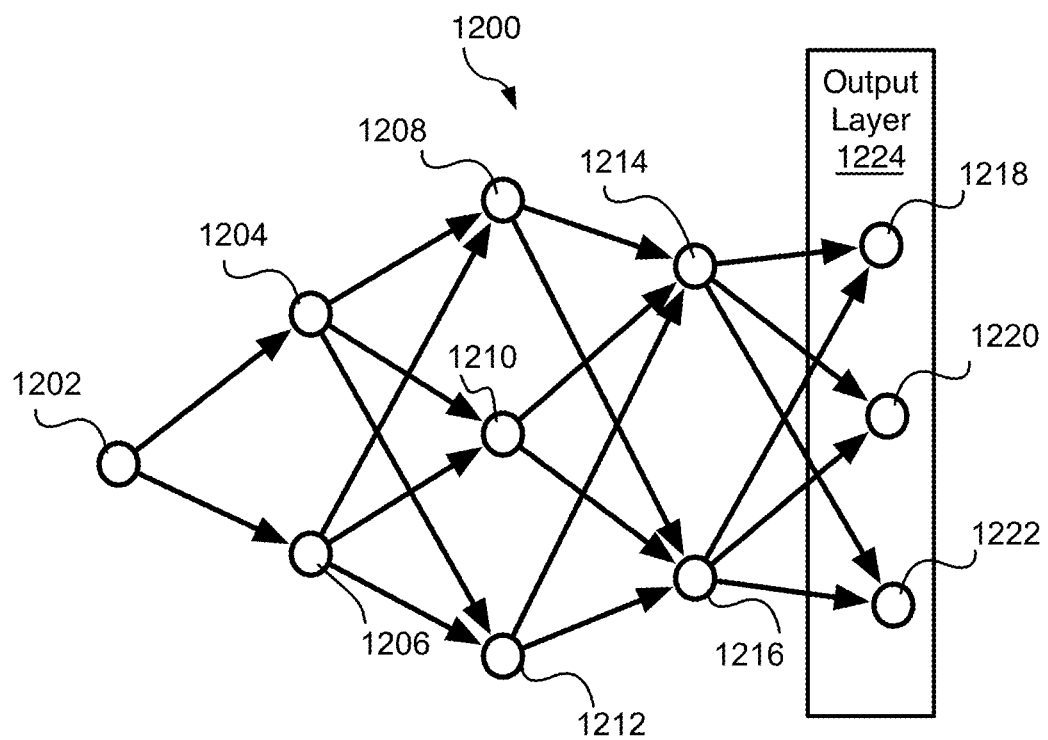
FIG. 12 is schematic diagram of a representation of an acoustic model.

Referring to FIG. 12, a simplified, rough acoustic model or network 1200 is provided to assist with explaining the acoustic model operation to generate acoustic model state activation values discussed herein. Acoustic model 1200 has nodes 1202 to 1222 numbered evenly and where input node 1202 receives a frame value input of a frame term for a current frame being analyzed, and received one at a time. Nodes 1204 to 1216 may form hidden layers of a DNN for example as explained herein, and nodes 1218 to 1222 may form output acoustic model states thereby forming an output layer 1224 of the acoustic model 1200. The output acoustic model states 1218 to 1222, also identified with corresponding phoneme HMM states, each represent a different possible speech segment or phoneme piece that could be matched to the current frame term inputted to the acoustic model 1200. This may include all such possible segments represented in the system or some sub-set of them particularly targeted to this frame term due to the frame value for example. The output acoustic model states each provide an activation value thereby providing a distribution of probabilities for matching the frame term. The activation values are numbered 1 to R for each frame term input on the acoustic model 1200, and are the values used in the posterior probability equations explained below.

Continuing with the example, process 500 then may include "input frame value of frame term to an acoustic model to determine a set of acoustic model state activation values j=1 to R for each inputted frame value" 506. Thus, the frame values then can be provided as input to an acoustic model (such as model 1200 just explained) at an acoustic scoring unit. A DNN or other network may be used to identify phoneme and provide the phoneme with acoustic scores. As mentioned, this could be on the basis of a single phoneme, tri-phones, or other phoneme combinations as described above. The output layer of the acoustic model is formed of the output acoustic model states (or MINI states by one example) such as states 1218 to 1222 just described, and that each have an output activation value for any one frame value that is input to the acoustic model. The highest activation (or most active) represented by the largest activation value is considered the matching state for a frame term, and the activation value from this state is combined with activation values of other frame terms using HMM algorithms and transition probabilities for example, to form an acoustic score for a full phoneme associated with multiple frame terms. The acoustic score for the full phoneme may be formed by the language model or may be considered an input to the language model. These activation values of the output acoustic model states for a frame term also are used to compute the posterior confidence scores herein.

Thus, process 500 may include "repeat for each frame term" 508, and as mentioned the determination of activation values may be performed for each frame term in an audio sequence.

Process 500 then may include "determine which frame terms form which phoneme" 510. By one approach, the feature extraction and acoustic scoring occurs before the decoding begins. By another example, the acoustic scoring may occur just in time. If acoustic scoring is performed just in time, it may be performed on demand, i.e., only scores that are needed during decoding are computed. After the phonemes are identified to provide the phoneme with acoustic scores, the identity of the phoneme, and in turn which frame terms form the phoneme, may be placed in memory, or otherwise made accessible or provided for computing posterior probabilities for the posterior confidence scores.

Process 500 may include "determine a sequence of phonemes that form an utterance indicated by outputs of a language model" 512. By one form, once the decoder receives the acoustic scores, the HMM, DNN, or other network on the WFST or other form of language model(s) being run by the decoder may determine which phonemes form the language model states of the language model by using the phoneme acoustic scores. The output utterances are those that have the language model states that best match the input speech.

Figure 6:
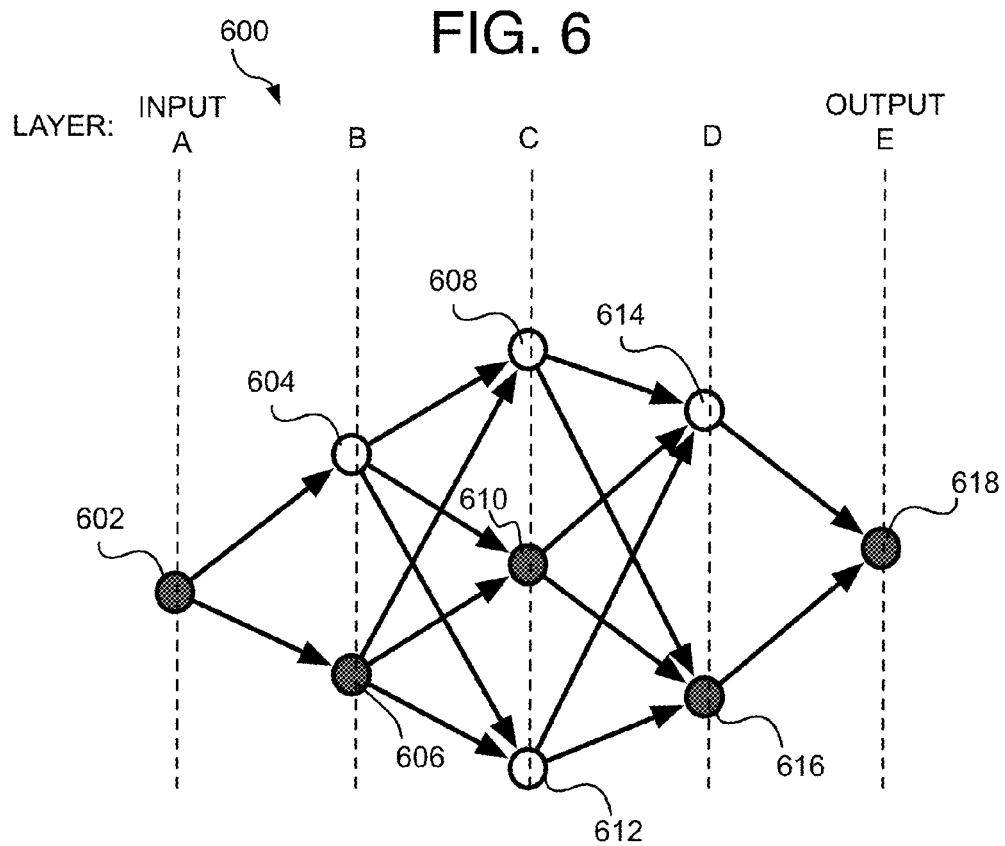
FIG. 6 is a schematic diagram of a decoder language model to be used with the implementations herein.
Figure 7:
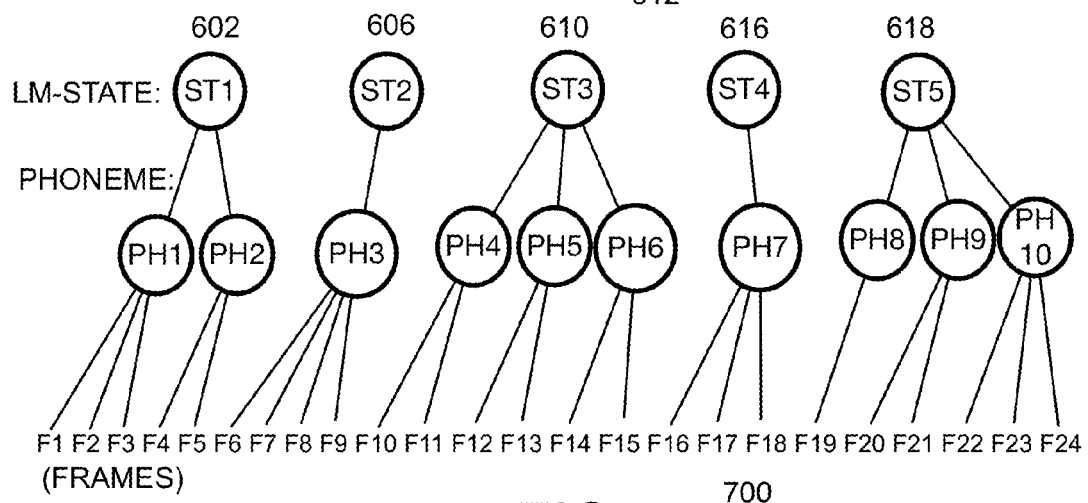
FIG. 7 is a schematic diagram to explain state, phoneme, and frame divisions according to the language model of FIG. 6 and the implementations herein.

Referring to FIGS. 6-7, a very rough, simplified representation of a language model 600 is provided merely to show the concept of how frame terms correspond to phonemes and the language model states on the language model. Example language network or model 600 may have the arrangement shown with states 602 to 618 numbered evenly and arranged in five or more or less layers A to E, and broken down to phoneme and frames by a diagram 700. The filled states 602, 606, 610, 616, and 618 form an output utterance being analyzed here, and are numbered as LM-states ST1 to ST5. Each state has its own phoneme sequence numbered PH1 to PH10. For example state ST3 (610) is formed from phonemes PH4, PH5, and PH6. The frames F1 to F24 that form each phoneme PH1 to PH5 are also shown, and in turn indirectly form LM-states ST1 to ST5.

The identity of the phonemes at the language model states may be provided or accessible for posterior probability computations as the decoder is building or running the models. In this case, posterior probabilities may be calculated for many or all phonemes on any language model state of the language model, even those that are not part of an output utterance (an utterance with one or more states on an output word lattice or is otherwise an n-best utterance of the language model). Once the decoder determines no candidate utterance or transcription uses certain phonemes (or a certain language model state), those phonemes may be dropped by the posterior probability unit for example. Any states that still remain in other candidate or output utterances will still have their computations preserved when a single language model state is part of more than one utterance. Otherwise, the posterior probability unit may wait until the decoder identifies which utterances are output utterances before obtaining the phoneme identifications for those utterances. In this case, the phoneme sequence for an utterance may be provided to a posterior probability unit as those phonemes are formed on an output word lattice or are otherwise indicated as an n-best output utterance of the language model of the decoder. The result is a sequence of phonemes for each candidate utterance.

Process 500 may include "determine which frame terms form the utterance" 514. Thus, once the identity of the phonemes are determined for an utterance, which frame terms form those phonemes are retrieved, accessed or otherwise obtained via the acoustic model data. The saved data from the acoustic scoring unit reveals which frame terms are used to form which phoneme.

Process 500 may include "obtain the frame value of the first frame term" 516, and "obtain the data of the first acoustic model state associated with the frame term of the utterance, and set j=1" 518. This is performed to begin computing the posterior probabilities for each output acoustic model state-frame term couple or pair. In other words, multiple probabilities maybe computed for each frame term, and for each output acoustic model state j=1 to R on the output layer of the acoustic model. Here, j is an output acoustic model state counter added for simplicity to show one possible example for providing posterior probabilities for each of the states. Thereby, the posterior probability of the first state given the first frame term of an utterance is to be computed.

Process 500 then includes "compute a probability of an acoustic model state j associated with the utterance given an individual current frame term" 520. The following explanation provides how the posterior probability equation was developed. The acoustic model DNNs that are used to generate the speech recognition input (acoustic scores) provided to the decoder are trained to produce estimates of the posterior HMM state probabilities for a given (input) acoustic feature vector and at the output layer of the DNN as explained above. That is, where X are input speech frames (corresponding to the frame term or frame value), W the selected word sequence, and Q the selected (HMM) state sequence, the pieces that make up this posterior probability $P(Q|X)$ and thus $P(W|X)$ are available from the values coming from the output layer of the DNN. In other words, the DNN output layer activations can be used to determine the likelihood of the HMM states, and in turn the likelihood of the phoneme sequences, word sequences, and utterances. Thus, it is possible to compute and use the posterior probabilities of an utterance directly, instead of computing some approximation after the fact (from the results of a word lattice or language model output scores). This produces a better estimate of the posterior probability especially when the language model is small. This also removes the dependency of the output scores on the language model when computing the posterior probabilities. Also, these direct DNN posterior probabilities are significantly better when computed as follows (versus using an output word lattice for example) because it can include consideration based on all the training data that went into building the DNN, not just the output word lattice. In particular, all the training data should include all of the phonemes in the language model at the decoder, many of which could be unrepresented in the output word lattice provided by the decoder to determine confidence scores when using small grammars.

In short, DNN based posterior probabilities may be determined by using the sum of the logs of the posterior HMM state given frame probabilities, when HMMs are used, and divided by the length of an utterance in frames (or the number of frames in the utterance) to provide a per-frame confidence score. Alternatively, the score is normalized by the number of phonemes in the words or phrases, by first summing the log terms individually for each phoneme and dividing by the length in frames of the phoneme to obtain a per frame average probability for the phoneme. Then these average values are summed and divided by the number of phonemes to obtain a per-phoneme confidence score. These normalizations, by frame and phoneme, keep a few well matched phonemes from dominating the scores.

In detail, the posterior probabilities of the state given input frame sequence, which may be a tied tri-phone HMM by one example, are computed to develop the confidence score for the match. The probability of the state given frame sequence is assumed to be the product of the individual state given frame probabilities, that is, the individual state given frame probabilities are assumed to be independent. Logarithms are taken of the probabilities so that the products can be calculated as sums. Thus, one of the first operations is to determine the posterior probability of a single output acoustic model state $q_i$ given one input frame X, that is, $p(q_i|X)$. This will be repeated for each state to frame match in an utterance. The subscript i refers to one of the output acoustic model phoneme HMM states 1 to R of the acoustic model.

By one approach, process 500 may include "use the activation value of the output acoustic model state on the acoustic model to compute the probability" 522. Thus, the activation value of the node of the output layer of the DNN acoustic model associated with the state $q_i$ of the HMMs for input frame X is $a(q_i|X)$. Then $p(q_i|X)$ is determined using the softmax (or sigmoidal) normalization by:

$$p(q_i \mid X) = \frac{e^{a(q_i|X)}}{\sum_{j=1}^{R} e^{a(q_j|X)}} \qquad (1)$$

where the output acoustic model (HMM) state indices j range from 1 to R. Thus, the denominator is the sum for all states of the phoneme HMMs corresponding to the nodes of the output layer of the acoustic model for a single frame term X, and of all e to the (exponent) activation value of each state given frame X. The normalization function may be any function that converts a set of values into 0 to 1 valued probabilities. The softmax has the valuable property of reducing the influence of extreme values in the data.

Also as mentioned, process 500 may include "determine log of the probability" 524 in order to prevent underflow of the values, provide more resolution to the values, and so that sums can be taken of the probabilities. Taking the logs of equation (1), the following is the result:

$$\log(p(q_i|X))) = a(q_i \mid X) - \log\left(\sum_{j=1}^{R} e^{a(q_j|X)}\right) \qquad (2)$$

where the terms are defined as above.

An issue with this overall formulation is that the log(sum) term above (essentially the denominator in the probability calculation (1)) may not be numerically stable such that if it is implemented directly, small values may be lost or underflow. To compensate for this, process 500 may include "determine and use the maximum state activation value among the states for the current frame term" 526. Thus, an equation with more accurate results can be determined using the following observation:

$$\log(e^a+e^b)=\log(e^{a-c}+e^{b-c})+c \qquad (3)$$

The value for c can be selected to make the log(sum) term easiest to compute, and in this case, the maximum value of the activation of phoneme HMM states for the frame X can be used, where the maximum is over the $q_j$ from j=1 to R:

$$c = \max a(q_j \mid X) \qquad (4)$$

Then:

$$\log\left(\sum_{j=1}^{R} e^{a(q_j|X)}\right) = \log\left(\sum_{j=1}^{R} e^{a(q_j|X)-c}\right) + c \qquad (5)$$

This improves the stability of the computation because the maximum value used in the exponent, once offset by the maximum value c, is 0. Actually, because this sum is so small after the offset (all non-zero exponent terms are negative), a good approximation to the log(sum) term is to use c itself. So substituting all terms, the probability of a current state i of the set of acoustic model states 1 to R forming the output layer of an acoustic model and given a single frame value of a frame term X that is inputted to the acoustic model is:

$$\log(p(q_i|X))) = a(q_i \mid X) - \log\left(\sum_{j=1}^{R} e^{a(q_j|X)-\max a(q_j|X)}\right) - \max a(q_j \mid X) \qquad (6)$$

where the maximum activation value is over all phoneme HMM states, or in other words, over all activation states in the output layer of the acoustic model for a single frame term.

By one optional approach, process 500 also may include "skip frame terms of silent or non-speech phonemes" 528, such that the posterior probability of a frame term is not computed at all unless the frame term is associated with non-silent human speech. In this case, no computed posterior probabilities are included in the summation component in equation (6) for non-speech or silent frame terms.

Thereafter, process 500 may include the inquiry "label state-frame term pair probability k=1 to N frames for the utterance" 530. Thus each state-frame probability pair or couple is tracked for summation and division to compute the confidence score of the utterance by being labeled by the frame it is a part of as explained below.

Process 500 then may include an inquiry "more acoustic model states for current frame term" 532, and if so, the process 500 may include "obtain data of next acoustic model state, and set j=j+1" 534. The process then loops back to operation 520 to compute the posterior probability $p(q_i|X)$ for the next output acoustic model state j of the frame term X This is repeated for each output acoustic model state in the output layer of the acoustic model that received the frame value of the current frame term (or frame) X.

When the posterior probability of the last output acoustic model state of a frame term is computed, process 500 then may include the inquiry "more frame terms in utterance?" 536. If so, process 500 then may include "obtain frame value of next frame term" 538 to obtain the data of the next frame X, and then loops back to operation 518 to obtain the activation value of the first output acoustic model state j=1 of the next frame term or frame X, and compute the next posterior probability. This is repeated for each frame term.

By one example approach, once the posterior probabilities of the last output acoustic model state of the last frame term of an utterance is computed, process 500 may include "determine utterance confidence score" 540. It will be understood, however, that the following tasks that do not need to be performed in sequence can be performed at overlapping times with the previous operations. Here, this operation preliminarily may include "remove posterior probabilities of frames of non-speech noise or silence" 542. Thus, if the frame values of silent or non-speech frame terms were not removed already when the posterior probabilities were being computed, those posterior probabilities of silent or non-speech frame terms can be removed now before being included in the sum of log posterior probabilities used in the computation of an utterance confidence value as explained below.

By one approach, process 500 may include "determine average per frame confidence score" 542. Accordingly, one way to compute the confidence score for an utterance is as follows. For an utterance consisting of N frames, $X_k$ for k=1 to N, the utterance confidence score S conf is the average value of the $\log(p(q_i|X))$ value for all frames:

$$S_{conf} = \frac{1}{N}\sum_{k=1}^{N} \log(p(q_{i(k)} | X_k)) \quad (7)$$

where the $q_{i(k)}$ are the sequence of phoneme HMM states found in the decoding of the utterance (or in other words, all of the output acoustic model states $q_{i(k)}$ chosen to match each frame $X_k$, k=1 to N). This includes summing all of the per frame log posterior probability values (or state-frame pair log probabilities) ($\log(p(q_i|X))$), and then dividing by the number of frames N in the utterance, where N may be all frames or the number of non-silent human speech frames. Each frame k=1 to N will have multiple probabilities, when matched with different HMM states in different transcription alternatives, as explained above.

By another approach, process 500 may include "determine confidence score per phoneme" 546. This approach finds the per-frame average for each phoneme of the decoding and then averages these values by dividing their total sum by the number of phonemes in the transcription. Specifically, process 500 may include "provide per frame average for individual phoneme" 548. As an example using network 600 again, once a log posterior probability is computed for each frame term (F1 to F24), they can be average for each phoneme. Thus, phoneme PH1 will have an average log posterior probability from the log posterior probabilities of frames F1, F2, and F3 that contribute to phoneme PH1. This is repeated for each phoneme PH1 to PH10 so that each phoneme in the utterance has its own average phoneme log posterior probability value.

Process 500 then may include "divide sum of phoneme averages by number of phoneme" 550. Thus, the sum of the average phoneme log posterior probabilities (one each for phoneme PH1 to PH10 for example of network 600) are summed, and then divided by the number of phonemes, here 10 by the network 600 example. The phonemes are used instead of frames to deemphasize well-matched phonemes.

Process 500 then may include "provide utterance as output of ASR if confidence score meets a criteria" 552. By one form, a threshold is determined during training that divides the incorrect utterance confidence scores from correct utterance confidence scores (as shown by example confidence score distribution chart 200). This may be the only confidence score for an utterance or may be one of a number of confidence scores that are used. Such other confidence scores may be based on a decoder's output word lattice results or DNN language model scores of an n-best utterance, and that are compared to their own threshold or other criteria. In these case, the confidence scores of each test may need to be passed to become the correct output of an utterance.

Process 500 may include "more output utterance sequences?" 554, and if so, process 500 may include "obtain data of next utterance sequence" 556, and the process loops back to operation 514 to analyze the sequence of frame terms and related acoustic model states for the next utterance, and then to compute the posterior probabilities for any acoustic model state not already analyzed in an earlier utterance. Thus, the analysis of the frame terms in a language model state need not be repeated for each utterance as long as it has been performed once. Then, those posterior probability values can be used again for different utterances since the activation functions and frame values should not change from utterance to utterance for the same language model state on the same language model for the same input speech. When the posterior probability unit is considered part of the decoder, such reduction in duplication can occur for any language model state in the language model regardless of which language model states (and in turn its phoneme and frame terms) end up forming an output utterance (or in other words, for partial utterance transcriptions).

If the posterior confidence values for the last utterance for a sequence of frames are already used, then the process 500 may include "more audio frame sequences?" 558, and if so, process 500 may include "obtain next audio sequence" 560 and to determine posterior confidence scores for the next audio sequence, the process loops back to operation 504. If not, the process ends.

Figure 8:
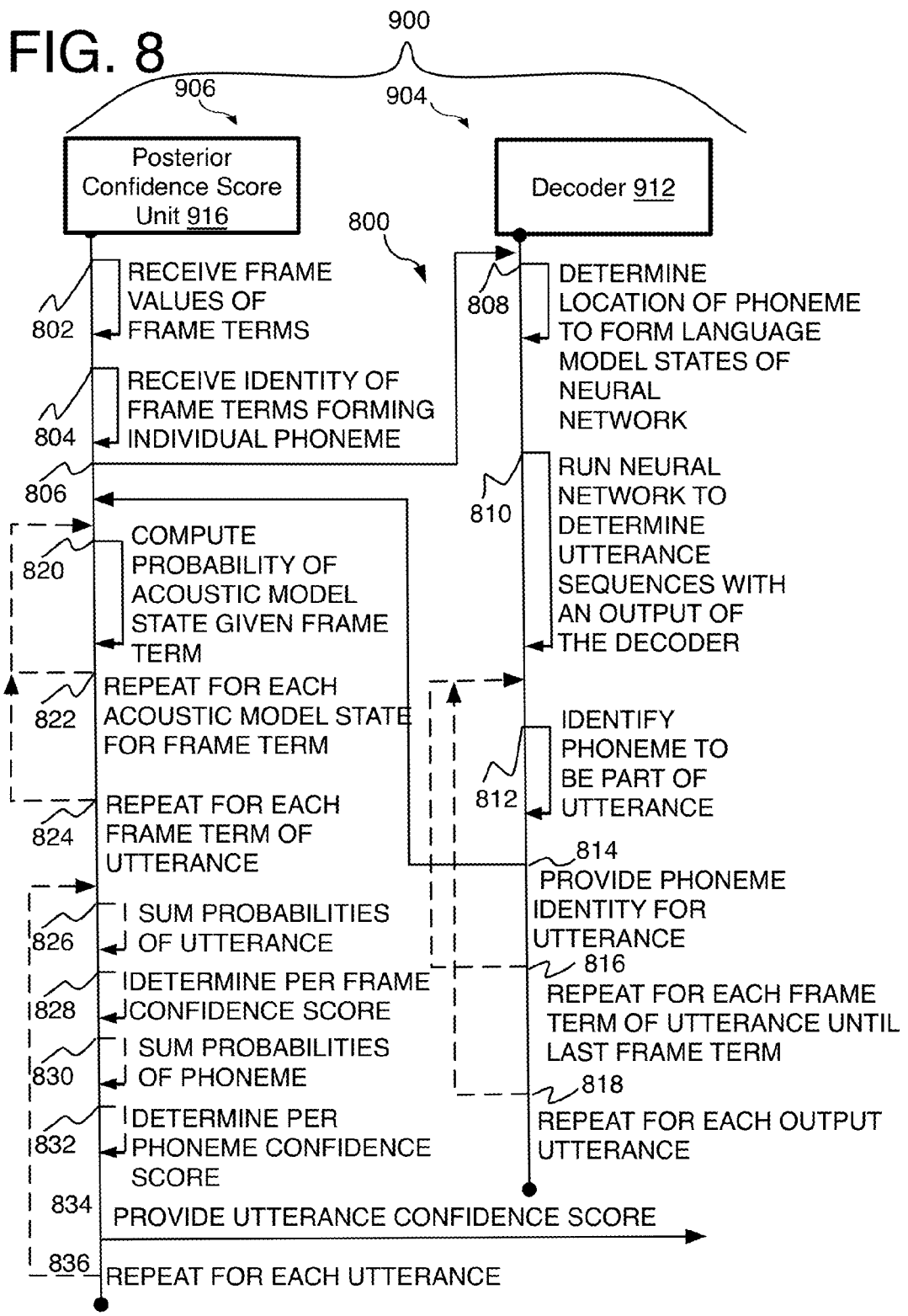
FIG. 8 is a schematic diagram of an ASR system in operation of the ASR method using posterior confidence scores in accordance with the implementations herein.

Referring to FIG. 8, the operation of a sample speech recognition processing system 900 for automatic speech recognition using posterior confidence scores is provided. In more detail, in the illustrated form, process 800 may include one or more operations, functions or actions as illustrated by one or more of actions 802 to 836 generally numbered evenly. By way of non-limiting example, process 800 will be described herein with reference to FIG. 9. Specifically, system 900 includes an acoustic frontend unit 908, an acoustic score unit 910, a decoder 912, a language interpreter execution unit 914, and a posterior confidence score unit 916. The operation of the system may proceed as follows with the acoustic score unit 910 (not shown on FIG. 8), decoder 912 and the posterior confidence score unit 916.

Process 800 may include "receive frame values of frame terms" 802. As mentioned above, this may include receiving frame values that were input into an acoustic model used to provide phonemes with acoustic scores. The frame values each correspond to a frame term of a single frame as described above.

Process 800 may include "receive identity of frame terms forming individual phoneme" 804, and also received from the acoustic model, or the unit running such a model.

Process 800 then transitions 806 to decoder operation, where process 800 may include "determine location of phoneme to form language model states of neural network" 808. This refers to the populating of the decoder's network, whether it is WFST based running an HMM or other DNN, and populating the language model states with the phonemes from the acoustic score unit, as per known decoder methods.

Process 800 may include "run neural network to determine utterance sequences with an output of the decoder" 810, and therefore, those utterances that are either considered the n-best candidate utterances of a language model or alternatively may refer to obtaining those phoneme states that are the output of the decoder and used to populate an output word lattice. These output utterances are to be provided with posterior confidence scores.

Process 800 may include "identify phoneme to be part of utterance" 812, and this refers to identifying which phoneme, and in which order, form the output utterances.

Process 800 then may include "provide phoneme identity for utterance" 814, and providing the identity of the phonemes to the posterior confidence score unit 916.

Process 800 may include "repeat for each frame term of utterance until last frame term" 816, such that the entire (or non-silence) sequence of the phoneme in the utterance is identified and provided to the posterior confidence score unit 916.

Process 800 may include "repeat for each output utterance" 818, and repeating the identification of the phoneme sequence in each output utterance.

Returning to the operation of the posterior confidence score unit, process 800 may include "compute probability of acoustic model state given frame term" 820, and as described above with processes 400 and 500, this refers to obtaining an activation value for each output acoustic model state on an acoustic model that received an input frame value of a current frame term, and a maximum activation value among those activation values for a single frame term. These values are used in a log of a normalization equation, such as softmax or sigmoid, to obtain a log of a posterior probability of an acoustic model state (such as an MINI state) given an individual frame term, and for all frames in an utterance. Equation (6) already described above may be one such example equation that is used to compute the posterior probability for each individual frame-state couple. Process 800 may include "repeat for each acoustic model state for frame term" 822, and "repeat for each frame term of utterance" 824. This will provide a log posterior probability for each frame in an utterance.

Next, to compute the utterance confidence score, process 800 may include "sum probabilities of utterance" 826, and then "determine per frame confidence score" 828 by dividing the sum by the number of frames in the utterance, such as that shown by example equation (7) above.

Alternatively, process 800 may include "sum probabilities of phoneme" 830, to "determine per phoneme confidence score" 832. This may include first summing the posterior probabilities within a single phoneme, and then dividing by the number of posterior probabilities (i.e., the number of frame terms of the single phoneme) to obtain an average log posterior probability value (or average probability of phoneme), and repeated for each phoneme. These average probabilities of the phoneme then can be summed, and by one form, divided by the number of phonemes to generate a per-phoneme confidence score for an utterance.

Process 800 may include "provide utterance confidence score" 834, and by one approach, providing the utterance confidence score to an interpretation unit that compares the utterance confidence score to a threshold, as one example criteria, and that determines whether the output transcription associated with the confidence score is correct or not, that is, whether the output transcription should be accepted and used in subsequent processing. This is performed without the use of the acoustic scores or language model scores used by the decoder in ways explained above. As mentioned above, there may be many variations where this confidence score determination is used alone or with other confidence determinations whether or not those other confidence scores do use the decoder's acoustic and language model scores. Process 800 may include "repeat for each utterance" 836, and by one form, a posterior confidence score is determined for each utterance saved as an n-best utterance or otherwise preserved on an output word lattice as mentioned above.

Any one or more of the operations of FIGS. 4, 5A-5C, and 8 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
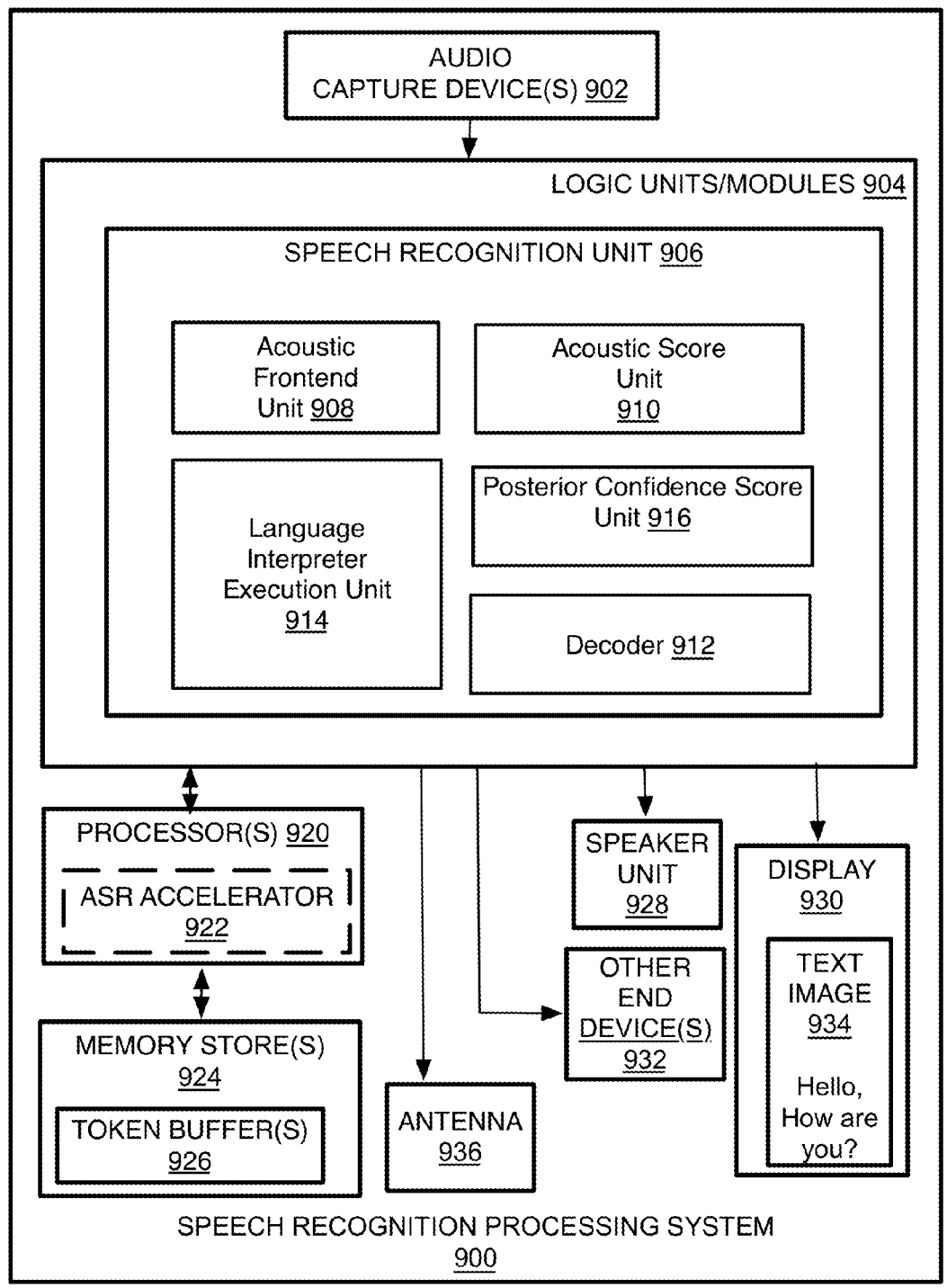
FIG. 9 is an illustrative diagram of an example system.

Referring to FIG. 9, an example speech recognition processing system 900 is arranged in accordance with at least some implementations of the present disclosure. In various implementations, the example speech recognition processing system 900 may have an audio capture device(s) 902 to form or receive acoustical signal data. This can be implemented in various ways. Thus, in one form, the speech recognition processing system 900 may be an audio capture device such as a microphone, and audio capture device 902, in this case, may be the microphone hardware and sensor software, module, or component. In other examples, speech recognition processing system 900 may have an audio capture device 902 that includes or may be a microphone, and logic modules 904 may communicate remotely with, or otherwise may be communicatively coupled to, the audio capture device 902 for further processing of the acoustic data.

In either case, such technology may include a telephone, a smart phone, a dictation machine, other sound recording machine, headphones, a headset, a mobile device or an on-board device, wearables such as a smart watch, smart glasses, or exercise band, or any combination of these. Thus, in one form, audio capture device 902 may include audio capture hardware including one or more sensors as well as actuator controls. These controls may be part of a sensor module or component for operating the sensor. The sensor component may be part of the audio capture device 902, or may be part of the logical modules 904 or both. Such sensor component can be used to convert sound waves into an electrical acoustic signal. The audio capture device 902 also may have an A/D converter, other filters, and so forth to provide a digital signal for speech recognition processing.

In the illustrated example, the logic modules 904 may include an acoustic front-end unit 908 that provides pre-processing as described with unit 308 (FIG. 3) and that identifies acoustic features and forms frame values, an acoustic score unit 910 that uses a HMM-DNN to provide acoustic scores for the acoustic features, a decoder 912 that uses a WFST to provide hypothetical utterance sequences as described herein, a posterior confidence score unit 916, as with confidence score unit 322, to compute posterior confidence scores based on the frame values determined in an order set by the decoder 912, and the output activation states used during acoustic scoring by acoustic score unit 910, and a language interpreter execution unit 914 that determines the user intent based on the posterior confidence scores computed herein alone or in addition to the usual confidence scores of output utterances of the decoder. The ASR components including the posterior confidence score unit 916 may be operated by, or even entirely or partially located at, processor(s) 920, and which may include, or connect to, an accelerator 922 to perform at least the posterior probability computations among many others. The logic modules 904 may be communicatively coupled to the components of the audio capture device 902 in order to receive raw acoustic data. The logic modules 904 may or may not be considered to be part of the audio capture device.

The speech recognition processing system 900 may have one or more of the processors 920 which may include a dedicated accelerator 922 such as the Intel Atom, memory stores 924 which may or may not hold the token buffers 926, and so forth mentioned herein, at least one speaker unit 928 to provide auditory responses to the input acoustic signals, one or more displays 930 to provide images 934 of text as a visual response to the acoustic signals, other end device(s) 932 to perform actions in response to the acoustic signal, and antenna 936. In one example implementation, the speech recognition processing system 900 may have the display 930, at least one processor 920 communicatively coupled to the display, at least one memory 924 communicatively coupled to the processor and having a token buffer 926 by one example for storing the tokens as explained above. The antenna 936 may be provided for transmission of the best word sequence matched or the input acoustic signal or other relevant commands to other devices that may act upon such a determination. Otherwise, the results of the speech recognition process may be stored in memory 924. As illustrated, any of these components may be capable of communication with one another and/or communication with portions of logic modules 904 and/or audio capture device 902. Thus, processors 920 may be communicatively coupled to both the audio capture device 902 and the logic modules 904 for operating those components. By one approach, although speech processing system 900, as shown in FIG. 9, may include one particular set of blocks or actions associated with particular components or modules, these blocks or actions may be associated with different components or modules than the particular component or module illustrated here.

Figure 10:
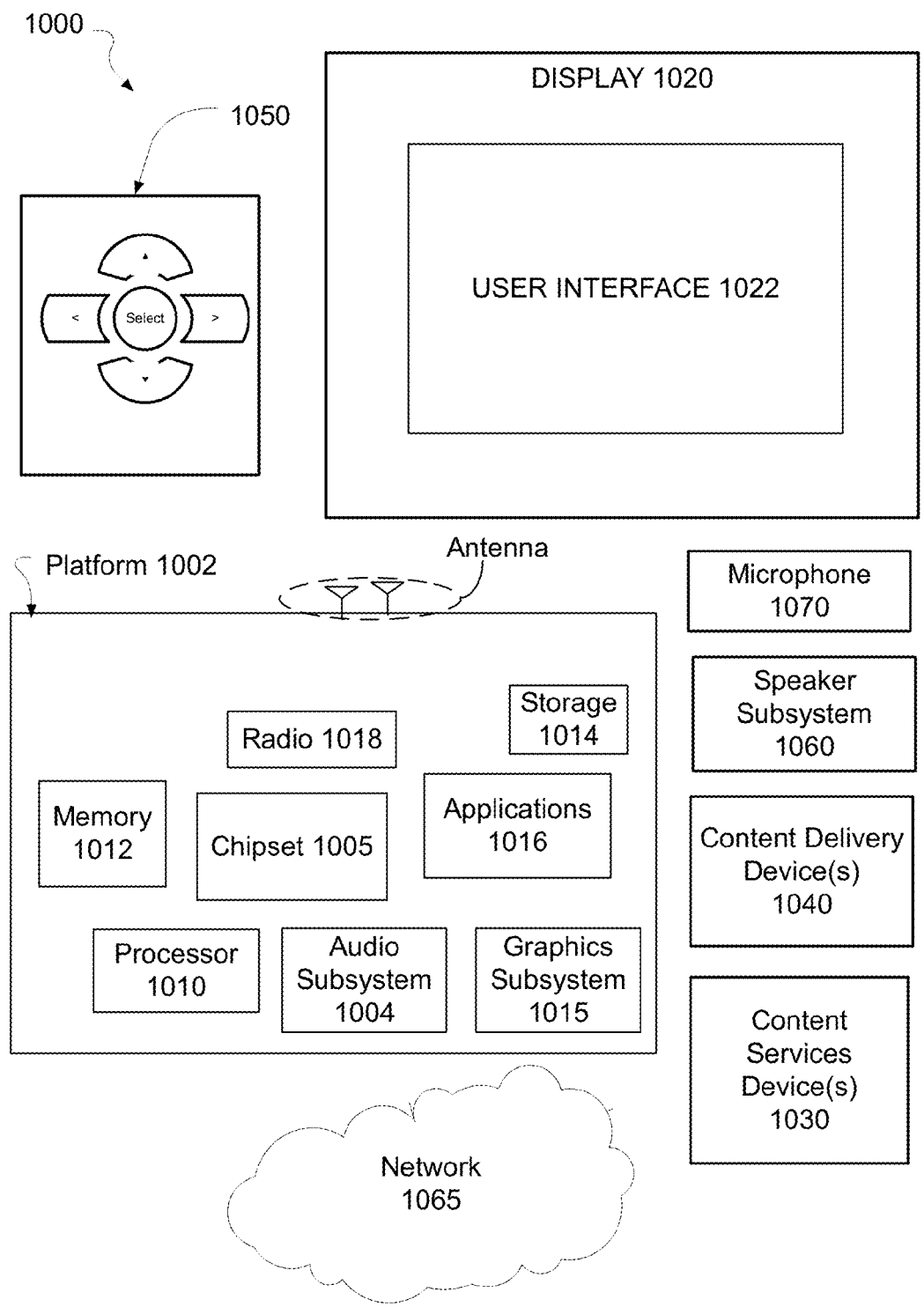
FIG. 10 is an illustrative diagram of another example system.

Referring to FIG. 10, an example system 1000 in accordance with the present disclosure operates one or more aspects of the speech processing system described herein. It will be understood from the nature of the system components described below that such components may be associated with, or used to operate, certain part or parts of the speech processing system described above. In various implementations, system 1000 may be a media system although system 1000 is not limited to this context. For example, system 1000 may be incorporated into a microphone, personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), wearable device (smart watch, smart glasses, exercise band), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002, speaker subsystem 1060, microphone 1070, and/or display 1020. Each of these components is described in greater detail below.

In various implementations, platform 1002 may include any combination of a chipset 1005, processor 1010, memory 1012, storage 1014, audio subsystem 1004, graphics subsystem 1015, applications 1016 and/or radio 1018. Chipset 1005 may provide intercommunication among processor 1010, memory 1012, storage 1014, audio subsystem 1004, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Audio subsystem 1004 may perform processing of audio such as acoustic signals for speech recognition as described herein and/or voice recognition. The audio subsystem 1004 may comprise one or more processing units and accelerators. Such an audio subsystem may be integrated into processor 1010 or chipset 1005. In some implementations, the audio subsystem 1004 may be a stand-alone card communicatively coupled to chipset 1005. An interface may be used to communicatively couple the audio subsystem 1004 to a speaker 1060, microphone 1070, and/or display 1020.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display, or any smartphone type display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020, speaker 1060, and microphone 1070. Platform 1002 and/or content services device(s) 1030 may be coupled to a network 1065 to communicate (e.g., send and/or receive) media information to and from network 1065. Content delivery device(s) 1040 also may be coupled to platform 1002, speaker 1060, microphone 1070, and/or to display 1020.

In various implementations, content services device(s) 1030 may include a microphone, a cable television box, personal computer, network, telephone, Internet enabled devices or appliance capable of delivering digital information and/or content, and any other similar device capable of unidirectionally or bidirectionally communicating content between content providers and platform 1002 and speaker subsystem 1060, microphone 1070, and/or display 1020, via network 1065 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1004 also may be used to control the motion of articles or selection of commands on the interface 1022.

Movements of the navigation features of controller 1050 may be replicated on a display (e.g., display 1020) by movements of a pointer, cursor, focus ring, or other visual indicators displayed on the display or by audio commands. For example, under the control of software applications 1016, the navigation features located on navigation controller 1050 may be mapped to virtual navigation features displayed on user interface 1022, for example. In implementations, controller 1050 may not be a separate component but may be integrated into platform 1002, speaker subsystem 1060, microphone 1070, and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example, or by auditory command. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002, speaker 1060, microphone 1070, and/or display 1020 may be an integrated unit. Display 1020, speaker 1060, and/or microphone 1070 and content service device(s) 1030 may be integrated, or display 1020, speaker 1060, and/or microphone 1070 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
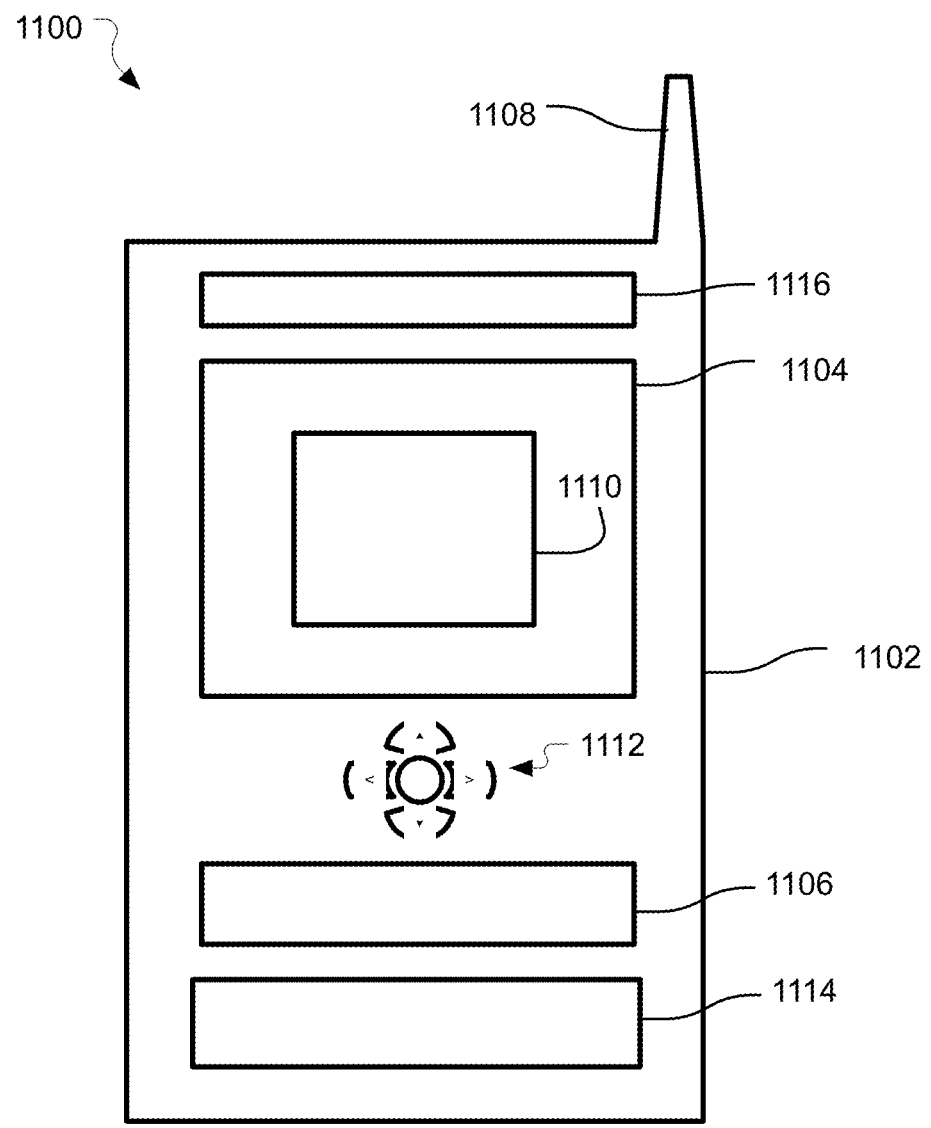
FIG. 11 illustrates another example device, all arranged in accordance with at least some implementations of the present disclosure.

Referring to FIG. 11, a small form factor device 1100 is one example of the varying physical styles or form factors in which system 900 or 1000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultralaptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any other on-board (such as on a vehicle) computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing 1102, a display 1104 including a screen 1110, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, software and so forth. Information also may be entered into device 1100 by way of microphone 1114. Such information may be digitized by a speech recognition device as described herein as well as a voice recognition devices and as part of the device 1100, and may provide audio responses via a speaker 1116 or visual responses via screen 1110. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of automatic speech recognition comprises receiving a plurality of frames of an audio sequence with audio data of human speech, wherein individual frames of the plurality of frames each have a frame term that is a segment of human speech wherein one or more frame terms form a single phoneme; receiving frame values wherein individual frame values are associated with a different frame term and used to form acoustic scores for a phoneme; determining which frame terms are associated with a candidate utterance of a language model; generating a plurality of probabilities each probability being of an individual acoustic model state given one of the frame terms associated with the utterance, wherein each frame term is separately provided to an acoustic model having multiple acoustic model states; and determining a confidence score of the utterance and to be used to determine whether the utterance is likely to match the actual speech recorded on the frames comprising combining the probabilities of the frame terms associated with the utterance.

By another implementation, the method also may comprise generating the probability for each frame term of the utterance; omitting the generation of probabilities, or omitting the probability in the combining of probabilities of frame terms, associated with silence or non-speech audio; wherein generating a plurality of probabilities comprises generating a probability of a single acoustic model state given a single frame term by using the activation value of the acoustic model state given the frame value of the single frame term, and repeated for multiple probabilities; wherein generating a plurality of probabilities comprises generating the probability of a single acoustic model state given a single frame term by using a sum of activation values of multiple acoustic model states for the single frame term, and repeated for multiple probabilities; wherein generating the probabilities comprises using a maximum activation value among the activation values of multiple acoustic model states of a single frame; wherein generating the probability comprises a softmax normalization; wherein determining the confidence score for a single utterance comprises using multiple frame terms each associated with multiple probabilities; wherein the utterances are only those utterances that are located on a language model output word lattice.

The method also comprising obtaining the order of phonemes of the utterance from at least one language model; determining the association of frame terms to the phonemes of the utterance; and using frame values each corresponding to a frame term in an order to perform the generating of probabilities depending on the associations between the frame terms and the phonemes; wherein one of: (1) the confidence score of the utterance is an average per frame probability related value, and (2) wherein the confidence score of the utterance is an average per phoneme probability related value; wherein the values of full phoneme acoustic scores that are associated with multiple frame terms are not used in the equation to compute the confidence score; and wherein output score values of the language model are not used in the equation to compute the confidence scores; wherein generating a plurality of probabilities comprises determining the log of individual probabilities comprising combining: (1) an activation value of the individual acoustic model state of an acoustic model receiving an input of a frame value of a current frame term; (2) a log of the sum of the log's base to the exponent being the difference between the activation value and a maximum activation value among multiple activation values of multiple acoustic model states of the acoustic model receiving the frame value of the current frame term as an input, and summed for each of the acoustic model states in the multiple acoustic model states of the acoustic model of the current frame term; and (3) the maximum activation value.

By yet another implementation, a computer-implemented system of automatic speech recognition comprises: at least one acoustic signal receiving unit to receive an audio signal to be divided into a plurality of frames of an audio sequence with audio data of human speech, wherein individual frames of the plurality of frames each have a frame term that is a segment of human speech wherein one or more frame terms form a single phoneme; at least one processor communicatively connected to the acoustic signal receiving unit; at least one memory communicatively coupled to the at least one processor; and a posterior confidence score unit operated by the at least one processor and to operate by: receiving frame values wherein individual frame values are associated with a different frame term and used to form acoustic scores for a phoneme; determining which frame terms are associated with a candidate utterance of a language model; generating a plurality of probabilities each probability being of an individual acoustic model state given one of the frame terms associated with the utterance, wherein each frame term is separately provided to an acoustic model having multiple acoustic model states; and determining a confidence score of the utterance and to be used to determine whether the utterance is likely to match the actual speech recorded on the frames comprising combining the probabilities of the frame terms associated with the utterance.

By another example, the system provides that one of: (1) wherein the confidence score is an average probability per frame associated with the utterance, and (2) wherein determining the confidence score comprises initially determining an average per-frame probability of individual phonemes associated with the utterance, and wherein determining the confidence score comprises summing the average per-frame probabilities of the individual phonemes, and dividing by the number of phonemes to form a per-phoneme confidence score of the utterance; wherein generating a plurality of probabilities comprises determining a log of the probability of an acoustic model state in an acoustic model given the frame term, and repeated for multiple acoustic model states in the acoustic model, and repeated for multiple frame terms of the utterance; and wherein determining the confidence score comprises summing the log of the probabilities; wherein the posterior confidence score unit is operated by obtaining the order and placement of phonemes of the language model that form the utterance; determining the association of the frame terms of the utterance with the phonemes; and placing the frame terms and frame values in order of the utterance across the multiple phonemes depending on the associations between the frame terms and phonemes; wherein the order and placement of phonemes in an utterance is learned to perform the generating of probabilities while operations on the language model with the phonemes are being performed and before all of the phonemes are assigned to all of the language model states of the language model forming the utterance.

The system also being arranged wherein the acoustic model states form the output layer of the acoustic model, and wherein the acoustic model states are identified with phoneme hidden Markov model (HMM)-based states; and wherein the values of full phoneme acoustic scores that are associated with multiple frame terms are not used in the equation to compute the confidence score; and wherein output score values of the language model are not used in the equation to compute the confidence scores; wherein generating a plurality of probabilities comprises determining the log of individual probabilities comprising combining: (1) an activation value of the individual acoustic model state of an acoustic model receiving an input of a frame value of a current frame term; (2) a log of the sum of the log's base to the exponent being the difference between the activation value and a maximum activation value among multiple activation values of multiple acoustical model states of the acoustic model receiving the frame value of the current frame as an input, and summed for each of the acoustic model states in the multiple acoustic model states of the acoustic model of the current frame; and (3) the maximum activation value.

By one approach, at least one computer readable medium comprises a plurality of instructions that in response to being executed on a computing device, causes the computing device to operate by: receiving a plurality of frames of an audio sequence with audio data of human speech, wherein individual frames of the plurality of frames each have a frame term that is a segment of human speech wherein one or more frame terms form a single phoneme; receiving frame values wherein individual frame values are associated with a different frame term and used to form acoustic scores for a phoneme; determining which frame terms are associated with a candidate utterance of a language model; generating a plurality of probabilities each probability being of an individual acoustic model state given one of the frame terms associated with the utterance, wherein each frame term is separately provided to an acoustic model having multiple acoustic model states; and determining a confidence score of the utterance and to be used to determine whether the utterance is likely to match the actual speech recorded on the frames comprising combining the probabilities of the frame terms associated with the utterance.

By another approach, the instructions cause the computing device to operate by generating the probability for each frame term of the utterance; omitting the generation of probabilities, or omitting the probability in the combining of probabilities of frame terms, associated with silence or non-speech audio; wherein generating a plurality of probabilities comprises generating a probability of a single acoustic model state given a single frame term by using the activation value of the acoustic model state given the frame value of the single frame term, and repeated for multiple probabilities; wherein generating a plurality of probabilities comprises generating the probability of a single acoustic model state given a single frame term by using a sum of activation values of multiple acoustic model states for the single frame term, and repeated for multiple probabilities; wherein generating the probabilities comprises using a maximum activation value among the activation values of multiple acoustic model states of a single frame; wherein generating the probability comprises a softmax normalization; wherein determining the confidence score for a single utterance comprises using multiple frame terms each associated with multiple probabilities; wherein the utterances are only those utterances that are located on a language model output word lattice.

The instructions also causing the computing device to operate by obtaining the order of phonemes of the utterance from at least one language model; determining the association of frame terms to the phonemes of the utterance; and using frame values each corresponding to a frame term in an order to perform the generating of probabilities depending on the associations between the frame terms and the phonemes; wherein one of: (1) the confidence score of the utterance is an average per frame probability related value, and (2) wherein the confidence score of the utterance is an average per phoneme probability related value; wherein the values of full phoneme acoustic scores that are associated with multiple frame terms are not used in the equation to compute the confidence score; and wherein output score values of the language model are not used in the equation to compute the confidence scores; wherein generating a plurality of probabilities comprises determining the log of individual probabilities comprising combining: (1) an activation value of the individual acoustic model state of an acoustic model receiving an input of a frame value of a current frame term; (2) a log of the sum of the log's base to the exponent being the difference between the activation value and a maximum activation value among multiple activation values of multiple acoustic model states of the acoustic model receiving the frame value of the current frame term as an input, and summed for each of the acoustic model states in the multiple acoustic model states of the acoustic model of the current frame term; and (3) the maximum activation value.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic speech recognition, comprising:
receiving a plurality of frames of audio data, wherein individual frames of the plurality of frames each have a frame term with a frame value representing a segment of human speech,
generating, by at least one processor, activation values comprising inputting individual frame terms into an acoustic model and resulting in generation of a plurality of activation values for each frame term and generated at individual acoustic model states, wherein a plurality of activation values from a plurality of different frame terms is used to form a single phoneme acoustic score to be input to a language model;
selecting, by at least one processor, those of the frame terms and those of the acoustic model states that are associated with a candidate utterance that has already been output by the language model and determined and selected after the already output utterance was formed; and
generating, by at least one processor, confidence scores indicating whether the utterance is likely to be the language in the frame terms associated with the already output utterance and comprising generating a plurality of probabilities each formed by using at least one of the activation values of the selected frame terms and selected acoustic model states, and combining the probabilities;
wherein generating a plurality of probabilities comprises at least determining a combination of versions of:
(1) a current activation value of a current one of the frame terms; and
(2) a difference between the current activation value and a maximum activation value among multiple activation values of multiple acoustic model states of the acoustic model receiving the frame value of the current frame term as an input.

2. The method of claim 1 comprising generating one of the plurality of probabilities for each frame term of the utterance.

3. The method of claim 1 comprising omitting the generation of probabilities, or omitting the probability in the combining of probabilities of frame terms, associated with silence or non-speech audio.

4. The method of claim 1 wherein generating a plurality of probabilities comprises generating the probability of a single acoustic model state given a single frame term by using a sum of a version of the activation values of the multiple acoustic model states for the single frame term, and repeated for multiple probabilities.

5. The method of claim 1 wherein generating the probability comprises a softmax normalization.

6. The method of claim 1 wherein determining the confidence score for a single utterance comprises using multiple frame terms each associated with multiple probabilities.

7. The method of claim 1 wherein the utterances are only those utterances that are located on a language model output word lattice.

8. The method of claim 1 comprising: obtaining the order of phonemes of the utterance from at least one language model; determining the association of frame terms to the phonemes of the utterance; and using frame values each corresponding to a frame term in an order to perform the generating of probabilities depending on the associations between the frame terms and the phonemes.

9. The method of claim 1 wherein the confidence score of the utterance is an average per frame probability related value.

10. The method of claim 1 wherein the confidence score of the utterance is an average per phoneme probability related value.

11. The method of claim 1 wherein the values of full phoneme acoustic scores that are associated with multiple frame terms are not used directly or indirectly to determine the confidence score; and
wherein output score values of the language model are not used in equations to compute the confidence scores.

12. The method of claim 1 wherein generating a plurality of probabilities comprises determining the log of individual probabilities comprising combining:
(1) an activation value of the individual acoustic model state of the acoustic model receiving an input of a frame value of a current frame term;
(2) a log of the sum of the log's base to the exponent being the difference between the activation value and a maximum activation value among multiple activation values of multiple acoustic model states of the acoustic model receiving the frame value of the current frame term as an input, and summed for each of the acoustic model states in the multiple acoustic model states of the acoustic model of the current frame term; and
(3) the maximum activation value.

13. The method of claim 1 wherein generating a plurality of probabilities comprises determining a combination of versions of:
(1) the current activation value;
(2) the difference between the activation value and the maximum activation value; and
(3) the maximum activation value.

14. The method of claim 1, wherein the probabilities and confidence scores are determined separately from the determination of which candidate utterances are output from the language model so that the probabilities and confidence scores do not contribute directly or indirectly to the outputting of candidate utterances from the language model.

15. A computer-implemented system of automatic speech recognition comprising:
at least one acoustic signal receiving unit to receive an audio signal to be divided into a plurality of frames of audio data, wherein individual frames of the plurality of frames each have a frame term with a frame value that is a segment of human speech wherein one or more frame terms form a single phoneme;
at least one processor communicatively connected to the acoustic signal receiving unit;
at least one memory communicatively coupled to the at least one processor; and
a posterior confidence score unit operated by the at least one processor and to operate by:
generating, by at least one processor, activation values comprising inputting individual frame terms into an acoustic model and resulting in generation of a plurality of
activation values for each frame term and generated at the individual acoustic model states, wherein a plurality of activation values from a plurality of different frame terms is used to form a single phoneme acoustic score to be input to a language model;

selecting, by at least one processor, those of the frame terms and those of the acoustic model states that are associated with a candidate utterance that has already been output by the language model and determined and selected after the already output utterance was formed; and generating, by at least one processor, confidence scores indicating whether the utterance is likely to be the language in the frame terms associated with the already output utterance and comprising generating a plurality of probabilities each formed by using at least one of the activation values of the selected frame terms and selected acoustic model states, and combining the probabilities wherein generating a plurality of probabilities comprises at least determining a combination of versions of:
(1) a current activation value of a current one of the frame terms; and
(2) a difference between the current activation value and a maximum activation value among multiple activation values of multiple acoustic model states of the acoustic model receiving the frame value of the current frame term as an input.

16. The system of claim 15 wherein the confidence score is at least one of:
an average probability per frame associated with the utterance,
a value determined by initially determining an average per-frame probability of individual phonemes associated with the utterance, and
a sum of average per-frame probabilities of individual phonemes, and divided by the number of phonemes to form a per-phoneme confidence score of the utterance.

17. The system of claim 15 wherein generating a plurality of probabilities comprises determining a log of the probability of an acoustic model state in an acoustic model given the frame term, and repeated for multiple acoustic model states in the acoustic model, and repeated for multiple frame terms of the utterance; and wherein determining the confidence score comprises summing the log of the probabilities.

18. The system of claim 15 wherein the posterior confidence score unit is operated by obtaining the order and placement of phonemes of the language model that forms the utterance;
determining the association of the frame terms of the utterance with the phonemes; and
placing the frame terms and frame values in order of the utterance across the multiple phonemes depending on the associations between the frame terms and phonemes; and
wherein the order and placement of phonemes in an utterance is learned to perform the generating of probabilities while operations on the language model with the phonemes are being performed and before all of the phonemes are assigned to all of the language model states of the language model forming the utterance.

19. The method of claim 15 wherein the acoustic model states are hidden Markov model (HMM)-based states; and
wherein the values of full phoneme acoustic scores that are associated with multiple frame terms are not used in the equation to compute the confidence score; and
wherein output score values of the language model are not used in the equation to compute the confidence scores.

20. The system of claim 15 wherein generating a plurality of probabilities comprises determining the log of individual probabilities comprising combining:
(1) an activation value of the individual acoustic model state of the acoustic model receiving an input of a frame value of a current frame term;
(2) a log of the sum of the log's base to the exponent being the difference between the activation value and a maximum activation value among multiple activation values of multiple acoustical model states of the acoustic model receiving the frame value of the current frame as an input, and summed for each of the acoustic model states in the multiple acoustic model states of the acoustic model of the current frame term; and
(3) the maximum activation value.

21. The system of claim 15 wherein generating a plurality of probabilities comprises at least determining a combination of versions of:
(1) the current activation value;
(2) the difference between the activation value and the maximum activation value; and
(3) the maximum activation value.

22. At least one non-transitory computer readable medium comprising a plurality of instructions that in response to being executed on a computing device, causes the computing device to operate by:
receiving a plurality of frames of audio data, wherein individual frames of the plurality of frames each have a frame term with a frame value representing a segment of human speech,
generating, by at least one processor, activation values comprising inputting individual frame terms into an acoustic model and resulting in generation of a plurality of activation values for each frame term and generated at the individual acoustic model states, wherein a plurality of activation values from a plurality of different frame terms is used to form a single phoneme acoustic score to be input to a language model;
selecting, by at least one processor, those of the frame terms and those of the acoustic model states that are associated with a candidate utterance that has already been output by the language model and determined and selected after the already output utterance was formed; and
generating, by at least one processor, confidence scores indicating whether the utterance is likely to be the language in the frame terms associated with the already output utterance and comprising generating a plurality of probabilities each formed by using at least one of the activation values of the selected frame terms and selected acoustic model states, and combining the probabilities
wherein generating a plurality of probabilities comprises at least determining a combination of versions of:
(1) a current activation value of a current one of the frame terms; and
(2) a difference between the current activation value and a maximum activation value among multiple activation values of multiple acoustic model states of the acoustic model receiving the frame value of the current frame term as an input.

23. The medium of claim 21 wherein generating a plurality of
probabilities comprises determining the log of individual probabilities comprising combining:

(1) an activation value of the individual acoustic model state of the acoustic model receiving an input of a frame value of a current frame term;
(2) a log of the sum of the log's base to the exponent being the difference between the activation value and a maximum activation value among multiple activation values of multiple acoustical model states of the acoustic model receiving the frame value of the current frame term as an input, and summed for each of the acoustic model states in the multiple acoustic model states of the acoustic model of the current frame term; and
(3) the maximum activation value;
wherein the values of full phoneme acoustic scores that are associated with multiple frame terms are not used in the equation to compute the confidence score; and
wherein output score values of the language model are not used in the equation to compute the confidence scores.

24. The medium of claim 22 wherein generating a plurality of probabilities comprises at least determining a combination of versions of:
(1) the current activation value;
(2) the difference between the activation value and the maximum activation value; and
(3) the maximum activation value.

* * * * *